United States Patent
Homma et al.

(10) Patent No.: US 7,529,182 B2
(45) Date of Patent: May 5, 2009

(54) COMMUNICATION DEVICE WITH 1:1 PROTECTION

(75) Inventors: Hiroyuki Homma, Kawasaki (JP); Kanta Yamamoto, Kawasaki (JP)

(73) Assignee: Fujitsu Limited, Kawasaki (JP)

( * ) Notice: Subject to any disclaimer, the term of this patent is extended or adjusted under 35 U.S.C. 154(b) by 854 days.

(21) Appl. No.: 10/769,624

(22) Filed: Jan. 30, 2004

(65) Prior Publication Data
US 2004/0223451 A1    Nov. 11, 2004

Related U.S. Application Data

(63) Continuation of application No. PCT/JP01/06629, filed on Aug. 1, 2001.

(51) Int. Cl.
*G01R 31/08* (2006.01)
(52) U.S. Cl. .................. 370/224; 370/228; 370/245
(58) Field of Classification Search ......... 370/216–228, 370/230, 230.1, 235, 252, 389, 242–245; 714/2–4; 340/3.43, 3.44, 825.01; 398/3–5; 709/251
See application file for complete search history.

(56) References Cited

U.S. PATENT DOCUMENTS

| | | | |
|---|---|---|---|
| 5,818,816 A * | 10/1998 | Chikazawa et al. | ......... 370/225 |
| 5,974,027 A | 10/1999 | Chapman | |
| 6,925,054 B1 * | 8/2005 | Atterton et al. | ............. 370/218 |
| 7,016,300 B2 * | 3/2006 | Luft et al. | .................. 370/221 |

FOREIGN PATENT DOCUMENTS

| | | |
|---|---|---|
| EP | 0 969 615 | 1/2000 |
| EP | 1 009 191 | 6/2000 |
| JP | 63-193634 | 8/1988 |
| JP | 09-098181 | 4/1997 |
| JP | 2000-069067 | 3/2000 |
| JP | 2000-083042 | 3/2000 |
| JP | 2000-253050 | 9/2000 |

OTHER PUBLICATIONS

GR-1230-CORE, Bellcore, SONET BLSR equipment generic criteria, Dec. 1999, issue 4, section 3 and 6.*
GR-253-CORE, Telcordia Technologies, SONET Transport systems: common generic criteria, Sep. 2000, issue 3, section 3 and 5.*
European Search Report dated Nov. 21, 2005.

* cited by examiner

*Primary Examiner*—Ian N Moore
(74) *Attorney, Agent, or Firm*—Katten Muchin Rosenman LLP

(57) ABSTRACT

A communication method for a network where a plurality of communication devices are interconnected and a plurality of pairs of working channels and backup channels are set in two paths between adjacent communication devices to perform 1:1-protection communications. For information traffic of a type where importance determined by the type of information to be transmitted is relatively high, the 1:1-protection communications is performed by using working channels set in one of the two paths when there is no failure, and by switching to backup channels set in the other of the two paths when a failure is detected. For information traffic of a type where the importance is relatively low, communications is performed by using channels other than the working channels set for the information traffic of a type where importance is relatively high, in the two paths, when there is no failure.

23 Claims, 18 Drawing Sheets

COMMUNICATION DEVICE WITH 1:1 PROTECTION

CROSS-REFERENCE TO RELATED APPLICATION

The present application is a continuation of International Application No. PCT/JP01/06629 which was filed on Aug. 1, 2001.

TECHNICAL FIELD

The present invention relates to a communication method and communication device, and more particularly to a communication method and communication device that can be suitably used in the Synchronous Optical Network (SONET) deployed as a ring topology that adopts a Bi-directional line switched ring (BLSR).

BACKGROUND ART

With steadily-increasing access to the Internet, the role of communication networks is approaching a great point of change. The core of conventional communications traffic is voice telephone communications, and the vital role of communication networks is to build up a voice communication network covering the global efficiently to provide communication services. A SONET ring is an example.

FIG. 18 shows a conventional SONET ring adopting a 2-fiber/4-fiber BLSR. In the SONET ring 100 shown in the figure, communication devices 101a to 104a are arranged in a ring configuration and interconnected through two or four optical fibers.

The SONET ring 100 is also connected with routers 101b to 104b, which are used for transmitting data traffic. More specifically, the communication device 101a is connected with the router 101b, the communication device 102a is connected with the router 102b, the communication device 103a is connected with the routers 103b-1 to 103b-3, and the communication device 104a is connected with the router 104b.

This enables any pairs of routers to transmit data traffic between them through the SONET ring 100. That is, as shown in FIG. 18, the routers 101b and 102b are able to transmit data traffic between them through the communication devices 101a and 102a.

Likewise, the routers 103b-1 and 102b are able to transmit data traffic through the communication devices 103a and 102a. The routers 101b and 103b-2 are able to transmit data traffic through communication devices 101a, 104a, and 103a, and the routers 103b-3 and 104b are able to transmit data traffic through the communication devices 103a and 104a. Note that any pairs of routers are connected with each other through SOENT cross-connect.

Between the communication devices of the above-described SONET ring 100, there are set many transmission channels along transmission directions (EW and WE directions indicated by arrows), through which frames are transmitted. Further, bidirectional line switched rings (BLSRs) have a redundant channel structure consisting of working channels and backup channels.

For example, a 2F-BLSR with Optical Carrier-Level 48 (or OC-48 level) includes 48 channels in both the EW direction and the WE direction. Among these, bidirectional channels #1 to #24 (ch #1 to ch #24) are set as working channels, and channels #25 to #48 are set as backup channels.

More specifically, the backup channels for the working channels #1 to #24 in the WE direction correspond to the backup channels #25 to #48 in the EW direction opposite to the WE direction. The backup channels for the working channels #1 to #24 in the EW direction correspond to the backup channels #25 to #48 in the WE direction opposite to the EW direction.

In the above-described channel configuration, when there is no failure, backup channels that correspond to half of the total number of channels are kept in reserve to assure reliability of communications incase of a failure. For instance, in the case of the above-described OC-48 level, 2.4 Gbit/s (Gbps) can be transmitted when all channels are used, and half the bandwidth (i.e., 1.2 Gbps) is kept in reserve in case of a failure.

However, the above-described SONET ring requires high reliability because it is primarily used for transmitting voice traffic. Particularly, it cannot be said that networks adopting BLSR are using bandwidth efficiently when there is no failure. With an increase in the number of Internet users, the amount of data traffic is increasing exponentially.

In these circumstances, the role of communication networks is changing to efficient transmission of increasing data traffic. Because of such a change, in SONET rings it is becoming necessary to use network resources efficiently for efficient data transmission.

DISCLOSURE OF THE INVENTION

The present invention has been made in view of the circumstances described above. Accordingly, it is the object of the present invention to provide a communication method and communication device that are capable of transmitting data traffic efficiently and increasing the transmission bandwidth of data traffic, by making efficient use of network resources.

To achieve this end, there is provided a first communication method for a network where a plurality of communication devices are interconnected and a plurality of pairs of working channels and backup channels are set in two paths between adjacent communication devices to perform 1:1-protection communications. For information traffic of a type where importance determined by the type of information to be transmitted is relatively high, the 1:1-protection communications is performed by using working channels set in one of the two paths when there is no failure, and by switching to backup channels set in the other of the two paths when a failure is detected. For information traffic of a type where the importance is relatively low, communications is performed by using channels other than the working channels set for the information traffic of a type where importance is relatively high, in the two paths, when there is no failure.

In accordance with the present invention, there is provided a second communication method for a network where a plurality of communication devices are interconnected and a plurality of pairs of working channels and backup channels are set in two paths between adjacent communication devices to perform 1:1-protection communications. For voice traffic, the 1:1-protection communications is performed by using working channels set in one of the two paths when there is no failure, and by switching to backup channels set in the other of the two paths when a failure is detected. For data traffic other than the voice traffic, communications is performed by using channels other than the working channels for the voice traffic in the two paths when there is no failure.

In the second communication method of the present invention, when there is no failure, the data traffic may be transmitted by using working channels set for the data traffic in the two paths, and when a failure of the transmission is detected, the data traffic may be transmitted by switching to backup channels set for the working channels.

In the second communication method, when there is no failure, the data traffic may be transmitted by using working channels for the data traffic in one of the two paths and backup channels for the data traffic in the other of the two paths. Also, when there is no failure, the data traffic may be transmitted by using working channels for the data traffic in one of the two paths and also using backup channels for the data traffic greater in capacity than the working channels in the other of the two paths.

In the second communication method, when there is no failure, the voice traffic may be transmitted by using backup channels for the voice traffic in the two paths. Also, when there is no failure, the voice traffic may be transmitted by using channels for non-preemptive unprotected traffic in the two paths.

When a failure is detected in the backup channel of the working and backup channels in the two paths that transmit the data traffic, the data traffic may be rerouted to the working channel to bypass the failure. Also, when the backup channel that is used for data traffic cannot be used in the other path because of a failure, the data traffic using the backup channel may be rerouted to the working channel for data traffic set in the one path.

In the above-described communication methods, the network may be a ring network capable of transmitting a transmitted frame according to the same protocol as a synchronous network, and the data traffic may be data packet traffic. In this case, a communications failure may be detected from the header information of a frame transmitted through the aforementioned synchronous network.

In accordance with the present invention, there is provided a communication device for use in a synchronous network that includes a plurality of pairs of working channels and backup channels capable of performing 1:1-protection communications for frame transmission by employing two paths. The communication device comprises a first processing system and a second processing system. The first processing system performs, on voice traffic, a process that performs the 1:1-protection communications by using working channels set in one of the two paths when there is no failure, and by switching to backup channels set in the other of the two paths when a failure is detected. The second processing system performs, on data traffic other than the voice traffic, a process that performs communications by using channels other than working channels for a signal of an information type where importance is relatively high, in the two paths when there is no failure.

In the communication device of the present invention, the aforementioned first processing system may comprise (1) a path changing switch which, based on the overhead information of a transmitted frame input through the synchronous network, uses a working channel when there is no failure, and switches to a backup channel set in the other path to transmit the frame onto the network when there is a failure, (2) an identification switch that identifies frame information input from the path changing switch as voice traffic or data traffic according to the setting of a channel, (3) a time-division multiplexing switch that performs time-division multiplexing on the frame information of the voice traffic identified by the identification switch, and (4) a selector that outputs both the time-division multiplexed voice traffic and the data traffic to the path changing switch. Also, the aforementioned second processing system may comprise the path changing switch, identification switch, and selector shared with the first processing system, and a data traffic processing part that reconstitutes the frame information of the data traffic identified by the identification switch as a frame that is transmitted by a predetermined data traffic channel, based on the header information of the transmitted frame and the destination of each data packet. In the communication device of the present invention, the aforementioned data traffic processing part may comprise (1) a framer-deframer for splitting the frame information of the data traffic from the identification switch into data packets, packaging data packets into frames, and outputting the frames to the selector, (2) a packet transmission-reception processing part for performing a reception process on the data packets split by the framer-deframer, and performing a transmission process on the data packets that are packaged into frames by the framer-deframer, and (3) a packet switch for performing a necessary routing process on the data packets on which the reception process was performed by the packet transmission-reception processing part.

Also, the aforementioned data traffic processing part may comprise (1) a packet synchronization processing part for performing a packet synchronization process on the frame information from the identification switch and splitting it into data packets, (2) a header information application part for applying information containing the receiving-channel information of the frame information that is split into data packets in the packet synchronization processing part, as header information, (3) a packet switch for performing a necessary routing process on the data packets from the header information application part, (4) a header information terminating-scheduling part for terminating the header information applied by the header information application part and performing a scheduling process required for frame transmission in the network, on the data packets on which the routing process was performed by the packet switch, and (5) a packet encapsulation part for encapsulating the data packets on which the scheduling process was performed by the header information terminating-scheduling part, and outputting them to the selector.

In the communication device of the present invention, the aforementioned header information application part may be constructed to apply information on a failure in the network that is contained in the header information. The aforementioned routing part may be constructed to perform the routing process in relation to the path switching operation performed by the path changing switch, based on the information on a failure contained in the header information. The aforementioned header information terminating-scheduling part may be constructed to perform scheduling on a plurality of series of traffic that conflict due to the routing process performed in the routing part.

In above-described communication device, overhead information, which is employed as the header information application part applies header information containing information on a failure in the network, may be the same as overhead information that is employed as the failure is judged by the path changing switch.

The aforementioned second processing system may be constructed so that when there is no failure, working channels set for the data traffic are used in the two paths, and when a failure is detected, the working channels are switched to the backup channels set for the working channels.

The aforementioned second processing system may use working channels in one of the two paths and backup channels in the other of the two paths to transmit the data traffic, when there is no failure. Also, the second processing system may use working channels in one of the two paths and use both backup channels set for the working channels and backup channels set for other information types in the other of the two paths, to transmit the data traffic, when there is no failure.

The aforementioned second processing system may be constructed to use backup channels in the two paths to transmit the voice traffic, when there is no failure. Also, the second processing system may be constructed to use channels for non-preemptive unprotected traffic in the two paths when there is no failure.

In the above-described communication device, the aforementioned second processing system may be constructed to use working channels in one of the two paths and backup channels in the other of the two paths to transmit the data traffic, when there is no failure. Also, the aforementioned routing part may be constructed to perform a routing process so that when a failure is detected in the other of the two paths on the basis of the information on a failure contained in the header information, the backup channels used when there is no failure are switched to working channels that are used in one of the two paths.

In the above-described communication device, the aforementioned second processing system may be constructed to use channels for non-preemptive unprotected traffic in the two paths when there is no failure, and the aforementioned routing part may be constructed to perform a routing process to bypass a place of a failure in the network, based on the information on a failure contained in the header information.

Also, the aforementioned routing part may be constructed so that when it is judged from the header information applied in the header information application part that traffic cannot reach its destination even in the two paths, data packets to the destination are not routed.

Thus, the communication method and communication device of the present invention have the following advantages:

(1) Because network resources are efficiently used while guaranteeing bandwidth and quality of service in the unit of a packet, efficient transmission of data packet traffic becomes possible and the bandwidth of data packet traffic can be increased.

(2) Even if channel switching by 1:1 protection occurs when a failure occurs, holding the connectability of data packet traffic transmitted by a backup channel becomes possible.

(3) By using working channels in opposite directions as channels for data traffic, paths WE and EW in opposite directions can maintain connectability when a failure occurs. This makes it possible to provide service that 100 percent guarantees bandwidth and delays. In addition, it becomes possible to guarantee bandwidth and quality of service in the unit of a packet independently of a failure.

(4) When there is no failure, data traffic is transmitted by using working channels in one of the two paths and backup channels in the other of the two paths. Therefore, in addition to the above-described advantage (1), when there is no failure, the number of working lines to be used as IP channels can be reduced without losing connectability when there is a failure, and the bandwidth of data packet traffic can be made inexpensive.

(5) Working channels can be used in one of the two paths to transmit data traffic, and backup channels greater in capacity than the working channels can be used in the other path to transmit data traffic. Therefore, the number of working lines for data traffic can be considerably reduced and the number of working lines required for constituting a bidirectional ring topology can be minimized. This renders it possible to provide the bandwidth of data traffic at low cost and in large capacity.

(6) When a failure is detected in a backup channel by the routing part, data packet traffic can be rerouted to a working channel to bypass that failure. Therefore, even if path switching by 1:1 protection occurs, holding the connectability of data packet traffic transmitted by the backup channel becomes possible and data traffic, which is transmitted by channels set in both paths when there is no failure, can be guaranteed.

(7) The information, which is employed in applying information on a network failure by the header information application part, can be the same as the information that is employed in judging a failure by the path changing switch. Therefore, if judgments of switching are made consistent with each other, the switching time required for recovery can also be made nearly the same as the switching time required for 1:1-protection.

(8) Backup channels for voice traffic can be used in both paths. Therefore, when there is no failure, working channels does not have to be used to transmit data. This makes it possible to provide the bandwidth of data traffic at substantially less cost and in large capacity.

(9) When there is no failure, by using channels for non-preemptive unprotected traffic in two paths, it becomes possible to provide the bandwidth of data traffic at low cost. When there is a failure, it is also possible to provide a topology that guarantees a minimum propagation delay time at low cost without depending on SONET rings.

BEST MODE FOR CARRYING OUT THE INVENTION (a) Construction of a Communication Device According to an Embodiment of the Present Invention and Description of a SONET Ring Using the Communication Device An embodiment of the present invention will hereinafter be described with reference to the drawings.

Figure 1:
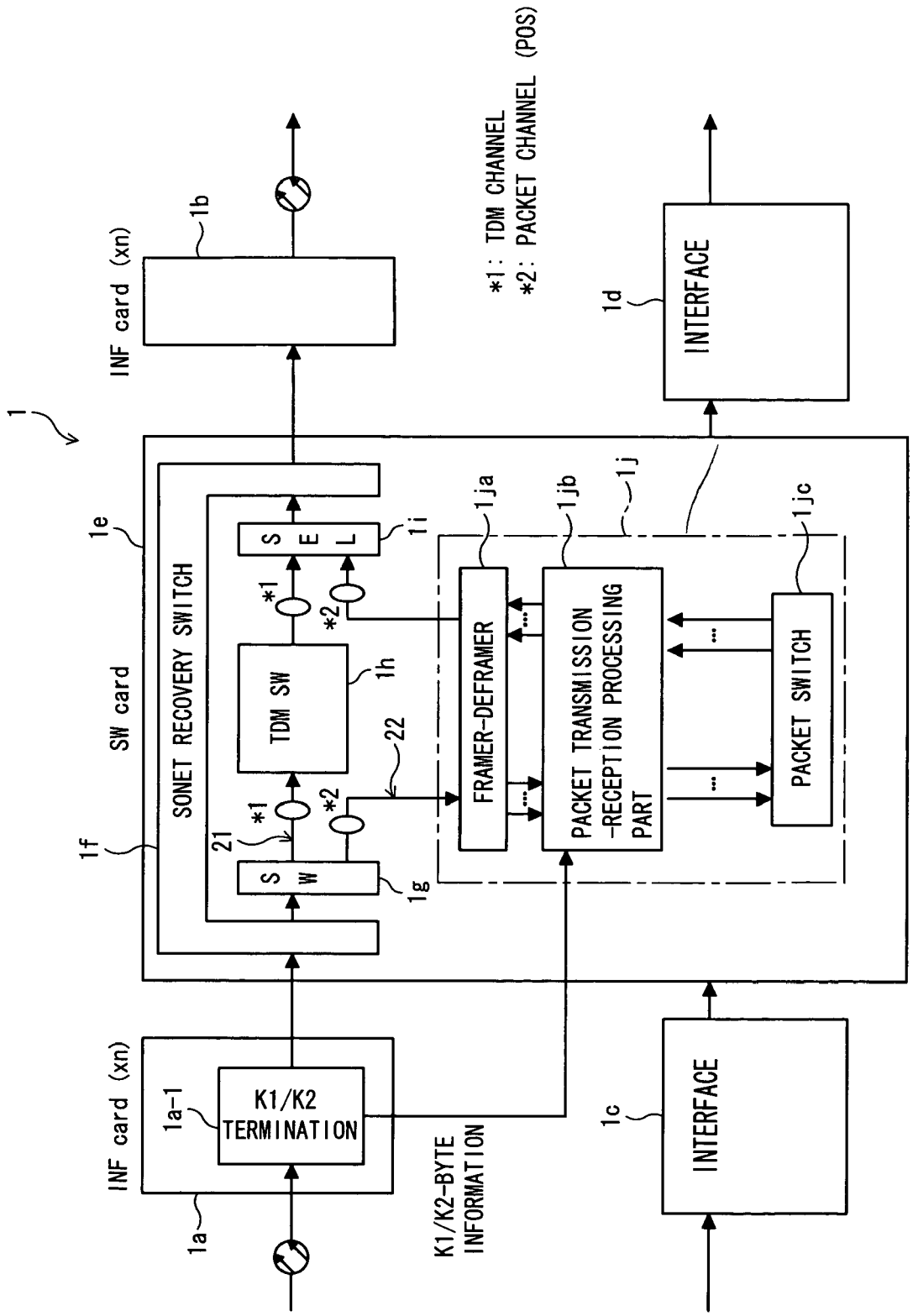
FIG. 1 is a block diagram showing a communication device constructed in accordance with an embodiment of the present invention.

FIG. 1 is a block diagram showing a communication device (which is installed at a SONET node) constructed in accordance with this embodiment. The communication device 1 shown in the figure can be employed as each of the communication devices 2a to 7a in a SONET ring 10 adopting a 2F/4F-BLSR, shown in FIG. 4.

Figure 4:
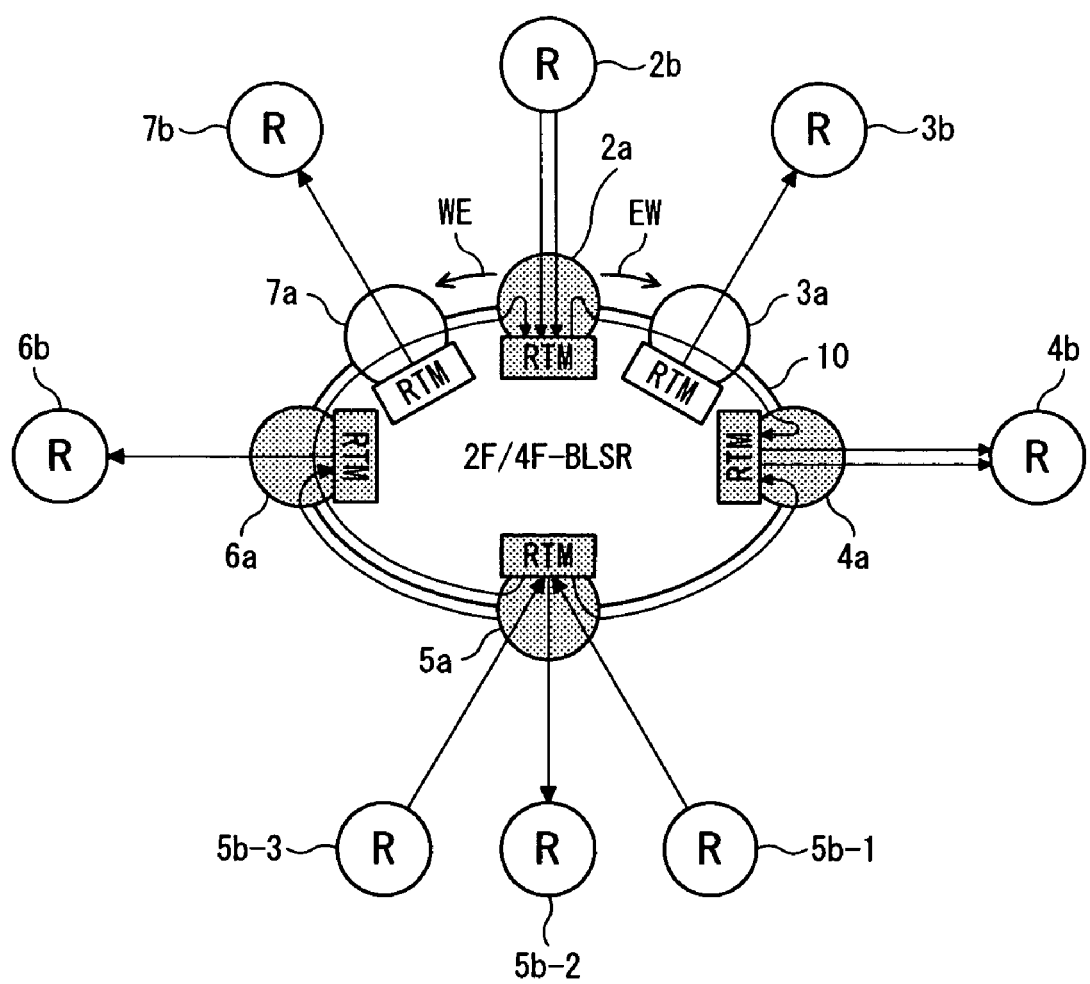
FIG. 4 is a diagram showing a SONET ring to which the communication device of the embodiment of the present invention is applied.
Figure 18:
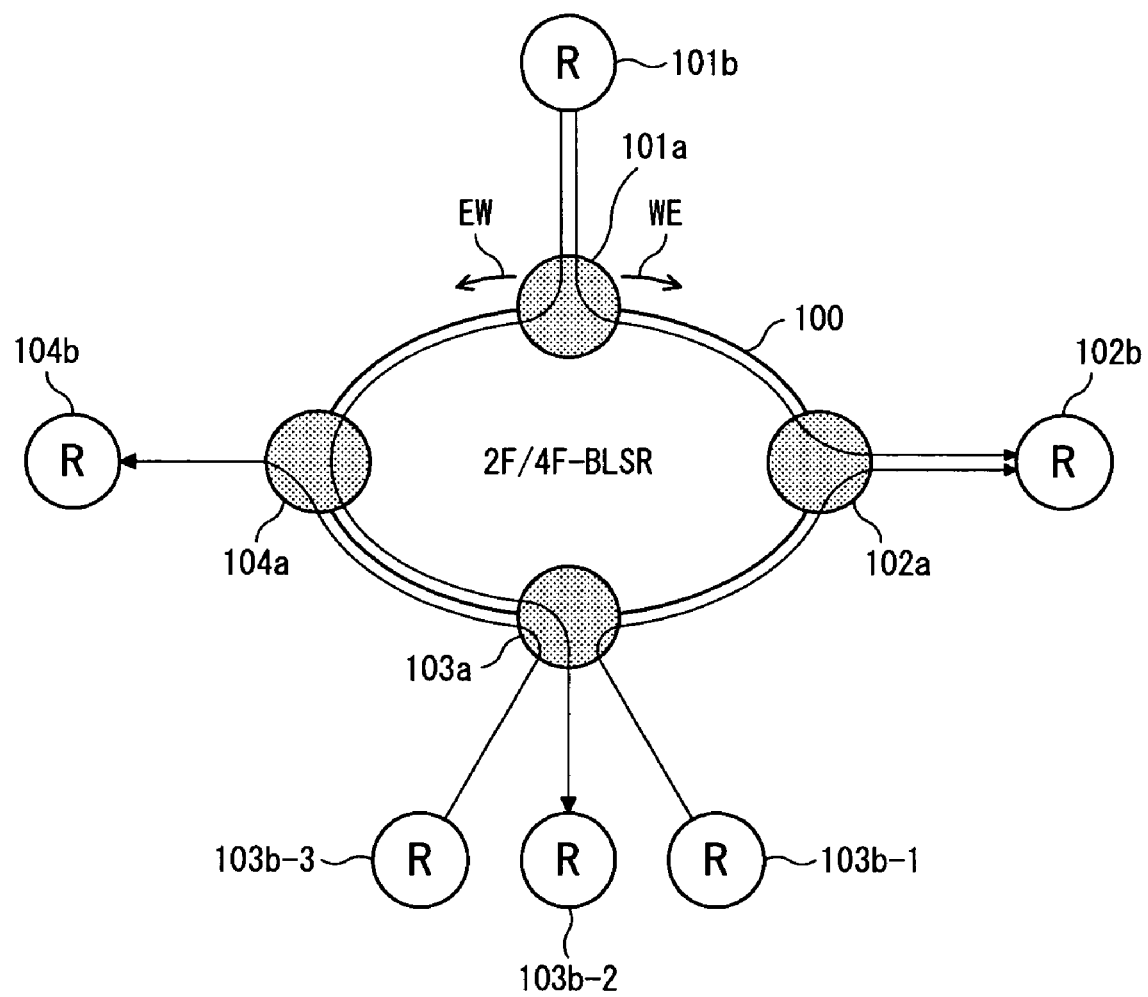
FIG. 18 is a diagram showing a conventional SONET ring that adopts a 2F/4F-BLSR.

As with the aforementioned communication devices 101a to 104a shown in FIG. 18, the communication devices 2a to 7a shown in FIG. 4 are connected with routers 2b to 7b that can handle data packet traffic. Between the routers 2b to 7b, data packet traffic can be transmitted through the SONET ring 10.

In the SONET ring 10 shown in FIG. 4, 6 communication devices 2a to 7a are interconnected in a ring configuration, and between two communication devices (transmitter and receiver), there are set two paths (see two paths in the directions indicated by arrows WE and EW in FIG. 4). There are set many working channels and backup (protection) channels that can transmit frames through 1:1-protection communications by employing the two paths.

For example, the SONET ring 10 has a plurality of channels (e.g., in the case of the OC-48 level, 48 channels #1 to #48) in each of the above-described paths WE (west to east) and EW (east to west). Half of the channels (#1 to #24) are used as working channels, and the remaining channels (#25 to #48) are used as backup channels for those working channels set in the other path. This makes it possible to perform 1:1-protection communications in the above-described two paths.

That is, in the case where a failure occurs on a transmission line (optical fiber), and the working channels #1 to #24 in the path WE are switched to backup channels, the traffic transmitted by the working channels #1 to #24 is transmitted by the backup channels #25 to #48 set in the path EW. On the other hand, in the case where the working channels #1 to #24 in the path EW are switched to the backup channels, the traffic transmitted by the working channels #1 to #24 is transmitted by the backup channels #25 to #48 set in the path WE.

In the above-described SONET ring 10 shown in FIG. 4, channels are used depending on the importance that is determined depending on the type of information to be transmitted. For instance, when there is no failure, information traffic with relatively high importance, such as voice traffic, is transmitted by working channels. On the other hand, when a failure is detected, the working channels are switched to the backup channels set in the other path. In this way, 1:1-protection communications can be performed.

Furthermore, in the communication device 1 of this embodiment (2a to 7a in FIG. 4), information traffic whose importance is relatively low, such as data packet traffic, can be transmitted by using channels other than channels selected for voice traffic transmission, in the two paths WE and EW, when there is no failure.

That is, when there is no failure, data traffic other than voice traffic can be transmitted by using channels other than working channels selected for voice traffic transmission, in the two paths WE and EW.

Note that the importance of signals that require recovery in a low layer, such as voice signals, can be made higher, while the importance of data that can be recovered in a high layer, such as data packets, can be made lower. Also, in this embodiment, a description will be given in the case where data traffic with low importance other than voice traffic is assumed to be IP-packet traffic. Further, there are five topologies for setting channels for data packets, peculiar to the present invention, as described later.

Returning to FIG. 1, the communication device 1 is equipped with interface cards 1a to 1d and a switch card 1e. The communication devices 2a to 7a shown in FIG. 4 have the same structure as the communication device 1.

The interface cards 1a, 1b are used for performing a reception interface process and transmission interface process on the SONET frame from the optical fibers (transmission lines) of the SONET ring 10. The optical fibers constituting the SONET ring 10 are connected through these interface cards 1a, 1b. For example, the communication device 5a shown in FIG. 4 is connected through the interface card 1a onto the optical fiber connected to the communication device 6a, and is also connected through the interface card 1b onto the optical fiber connected to the communication device 4a.

In the reception interface process in the interface cards 1a, 1b, optical signals input through the optical fibers (transmission lines) constituting the SONET ring 10 are converted into electrical signals, and also the overhead information of a SONET frame is terminated. For that reason, the interface cards 1a, 1b are equipped with an overhead terminating part 1a-1 for terminating the above-described overhead information.

In the transmission interface process in the interface cards 1a, 1b, overhead information such as transmission priority is attached to a bundle of data packets that are send out from the switch card 1e, and those data packets are sent out onto the optical fiber of the SONET ring 10 as a SONET frame.

Note that FIG. 1 shows only one direction where SONET frames are processed and transmitted through the SONET ring 10, but they can be transmitted in both directions.

Interface cards 1c, 1d are used for interfacing with external networks for packet and voice transmission.

More specifically, the interface 1c identifies both the packet signal from a router (not shown) and the voice signal from a voice communication device (not shown), according to the positions of the input ports. The interface 1c also converts a voice signal into a SONET frame on the basis of channels set for voice traffic and outputs it to a SONET recovery switch 1f. The interface 1c further converts a packet signal into a SONET frame on the basis of channels set for data packet traffic and outputs it to the SONET recovery switch 1f.

The interface 1d converts the SONET frame from the switch card 1e into a packet signal or voice signal by terminating the SONET frame, and sends it to a router or voice communication device through the output port.

In other words, the interface 1d performs a transmission interface process on the SONET frame that constitutes the voice signal or packet signal transmitted through the SONET ring 10, in order to send the signal to a router or voice communication device provided in the communication device 1. Depending on the types of signals, they are output from the corresponding output ports.

The switch card 1e, as shown in FIG. 1, is equipped with a SONET recovery switch 1f, a frame identification switch 1g, a time-division multiplexing (TDM) switch 1h, a selector 1i, and a routing module 1j.

The SONET recovery switch 1f serves as a path changing switch which, based on the overhead information of a frame input through the SONET ring 10, uses a working channel for that frame when there is no failure, and switches the working channel to a backup channel set in the other path to transmit that frame onto the SONET ring 10 when there is a failure.

That is, the SONET recovery switch 1f monitors the state of a line failure, based on the K1/K2-byte information from the overhead terminating part 1a-1. The SONET recovery switch 1f also performs the required channel switching process on a SONET frame signal input from the interface card 1a, or on a frame signal that is send out from the interface card 1b.

The failure information within the SONET ring 10 is inserted in the K1/K2-byte information that represents the overhead information of a SONET frame. The K1/K2 bytes are the line overhead bytes in a SONET frame and are used for the auto protection switching (APS) of a line level. In the routing module 1j described later, it becomes possible to recognize both information on a failure of a working channel in both paths WE and EW and ring-switching information in both paths WE and EW, by monitoring the K1/K2-byte information.

When there is no failure, voice traffic is passed through a working channel without being switched to the backup channel. On the other hand, in the case where a failure is detected and the working channel must be switched, it is switched to the backup channel set for that working channel.

The frame identification switch 1g serves as an identification switch that identifies the frame information input from the SONET recovery switch 1f, as voice traffic or data packet traffic, according to the channel of that frame information. That is, a frame transmitted by the channel for voice traffic is directed to the TDM switch 1h, while a frame transmitted by the channel for data packet traffic is directed to the routing module 1j.

The TDM switch 1h performs a time-division multiplexing process on the frame information of the voice traffic input from the frame identification switch 1g and sends it to the selector 1i.

The selector 1i performs a time-division multiplexing process on both the frame information of the voice traffic from the TDM switch 1h and the frame information from the routing module 1j and outputs the time-division-multiplexed frame information to the SONET recovery switch 1f. In the SONET recovery switch 1f, switching is performed between the paths according to the state of a transmission line, as described above, and the time-division-multiplexed frame information is output to the interface card 1b connected on the switched path.

The routing module 1j serves as a data traffic processing part, in which the packet frame information input from the frame identification switch 1g is reconstituted as a frame for predetermined data packet traffic, based on the header information of a transmitted frame and the destination for each data packet. For that reason, the routing module 1j is equipped with a framer-deframer 1ja and a packet transmission-reception processing part 1jb.

In the framer-deframer 1ja, the frame signal from the frame identification switch 1g is split into data packets, and also data packets are packaged into a frame and output to the selector 1j. For that reason, the framer-deframer 1ja is equipped with a packet synchronization processing part 1j-1 and a packet encapsulation part 1j-7, as shown in FIG. 2.

The packet transmission-reception processing part 1jb performs a reception process on the packets split from the frame signal at the framer-deframer 1ja and also performs a transmission process on the packets that are framed at the framer-deframer 1ja. For that reason, the packet transmission-reception processing part 1jb is equipped with a header-information application part 1j-2, a header terminating part 1j-5, and a scheduling part 1j-6, as shown in FIG. 2.

Figure 2:
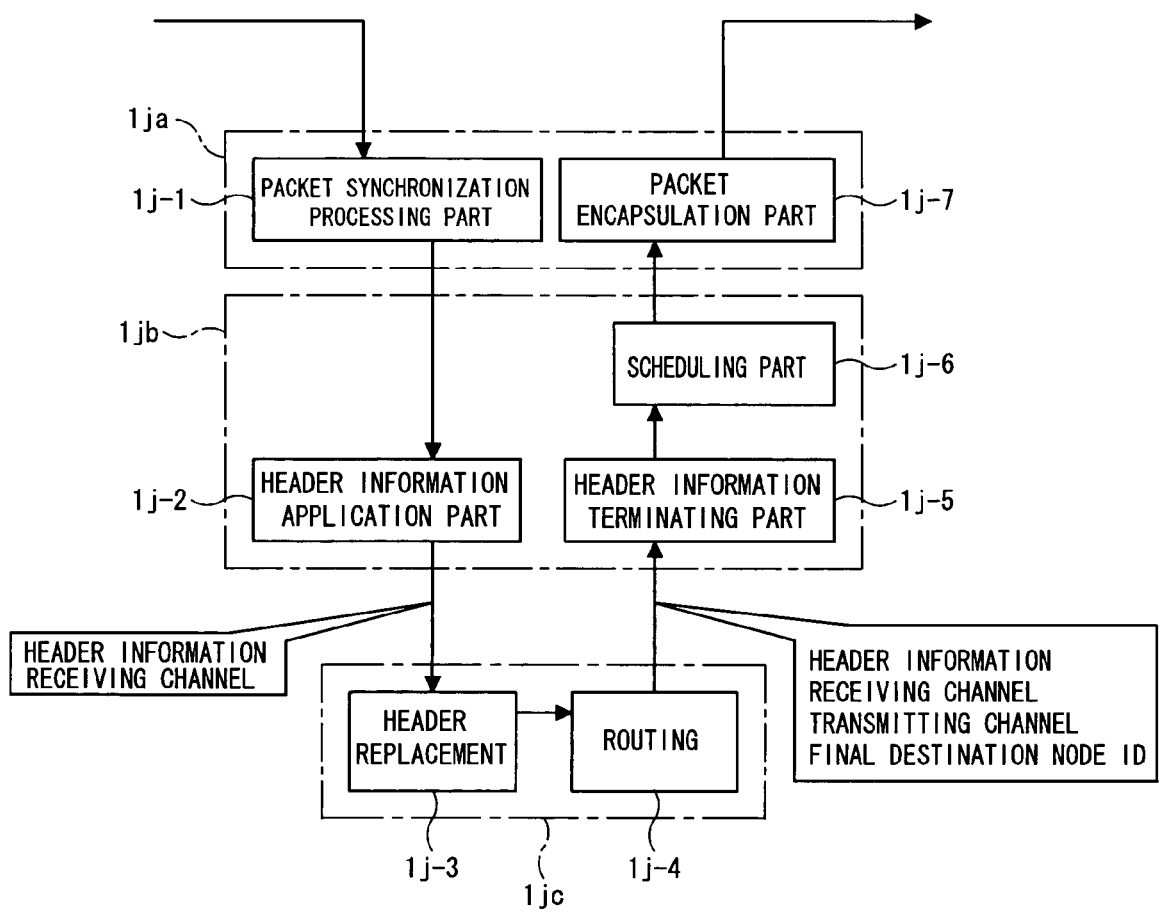
FIGS. 2 and 3 are block diagrams showing the principal part of the communication device shown in FIG. 1.

FIG. 2 shows a block diagram of the routing module 1j shown in FIG. 1. In FIG. 2, the packet synchronization processing part 1j-1 of the framer-deframer 1ja performs a packet synchronization process on the frame information consisting of data packets, input from the frame identification switch 1g, to split the frame signal into data packets.

The header-information application part 1j-2 of the packet transmission-reception processing part 1jb is used for applying header information (header information only for the switch card 1e) so that a packet switch 1jc to be described later can perform a routing process on each of the data packets from the packet synchronization processing part 1j-1.

More specifically, in the above-described header information application part 1j-2, the receiving-channel information in the frame information split into data packets by the packet synchronization processing part 1j-1, that is, the channel through which the frame input from the interface card 1a or 1c to the switch card 1e is transmitted, is applied as the above-described header information. In other words, the data packets constituting the same frame have the same channel information as header information.

Also, in the above-described header information application part 1j-2, failure information in the SONET ring 10 is contained in the above-described header information. In this case, the overhead information containing the failure information in the SONET ring 10 as the above-described header information, which is applied by the header information application part 1j-2, is the same as the overhead information that is employed as a failure is judged by the SONET recovery switch 1f.

The packet switch 1jc is used for performing a routing process on the data packet from the header information application part 1j-2, and is equipped with a header replacing part 1j-3 and a routing part 1j-4.

The header replacing part 1j-3 of the packet switch 1jc holds destination information that corresponds to the receiving channel that is the header information applied by the header information application part 1j-2, and employs that destination information as header information to update header information. The destination information includes a synchronous transport signal (STS) channel number, routing information (WE/EW), a ratio of working channels and backup channels for data packet traffic (1:1, 1:n, or channels for non-preemptive unprotected traffic (NUT channels)), and a destination node identifier.

That is, in the header replacing part 1j-3, the above-described destination information is obtained based on the receiving-channel information applied as header information to the data packet input from the packet transmission-reception processing part 1jb. And based on the receiving-channel and destination information, header information is updated.

Figure 7:
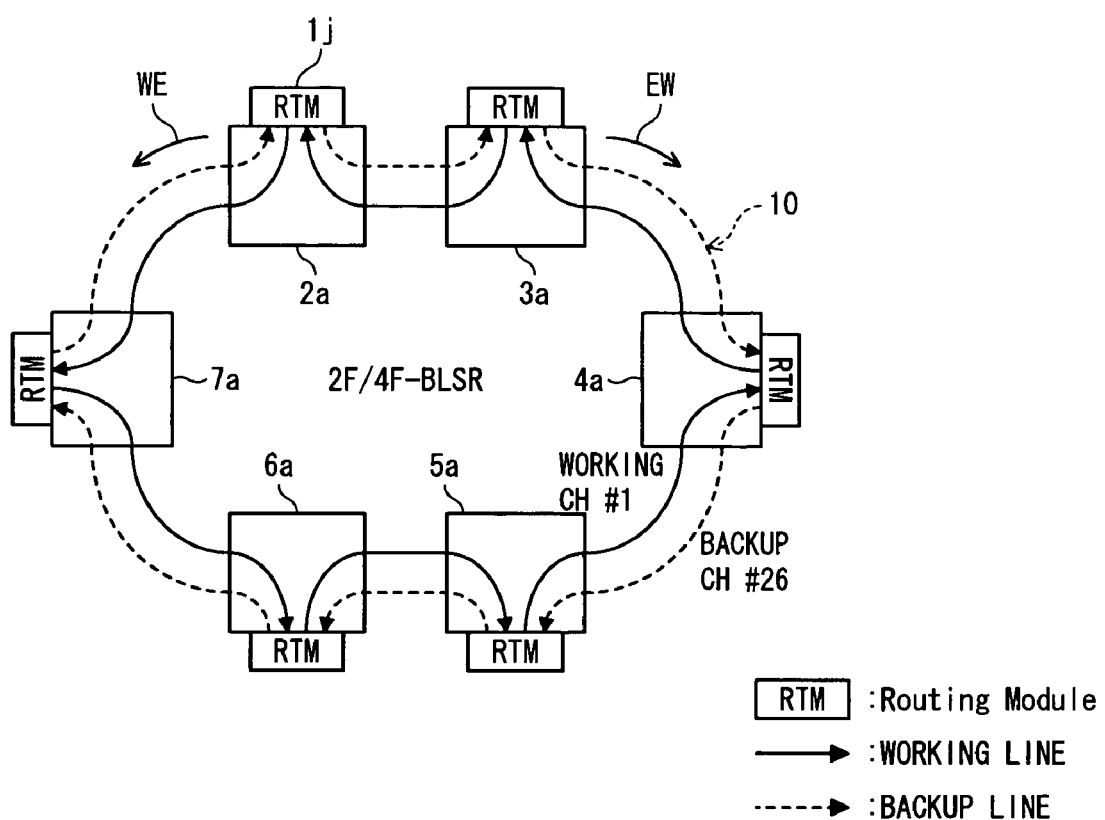
FIG. 7 is a diagram to explain a channel setting configuration that is a second topology for data packet traffic in the SONET ring constructed of the communication devices of this embodiment.

The routing part 1j-4, as in the case of FIG. 7, performs a routing process on the data packet from the header replacing part 1j-3 to switch to a working channel for the traffic using a backup channel, and outputs the processed data packet to the header terminating part 1j-5 of the packet transmission-reception processing part 1jb.

That is, the routing part 1j-4 performs a routing process in relation to the path switching operation of the SONET recovery switch 1f, based on the failure information contained in the header information. Therefore, in the SONET recovery switch 1f, when outputting a frame, frame information consisting of data packets routed to a working channel by the routing part 1j-4 can be transmitted by switching the working channel to a backup channel that will bypass a failure.

In other words, even when traffic transmitted by a working channel is transmitted by a backup channel, the traffic can be transmitted by the SONET backup channel, because the traffic originally uses the backup channel and has been routed to the working channel by the routing part 1j-4.

For the packet data routed by the packet switch 1jc, the header information terminating part 1j-5 of the packet transmission-reception processing part 1jb is used for terminating the header information applied by the header information application part 1j-2 and header replacing part 1j-3.

The scheduling part 1j-6 of the packet transmission-reception processing part 1jb performs a scheduling process on a plurality of series of traffic that conflict due to the routing process performed by the routing part 1j-4. The detailed structure is shown in FIG. 3.

Figure 3:
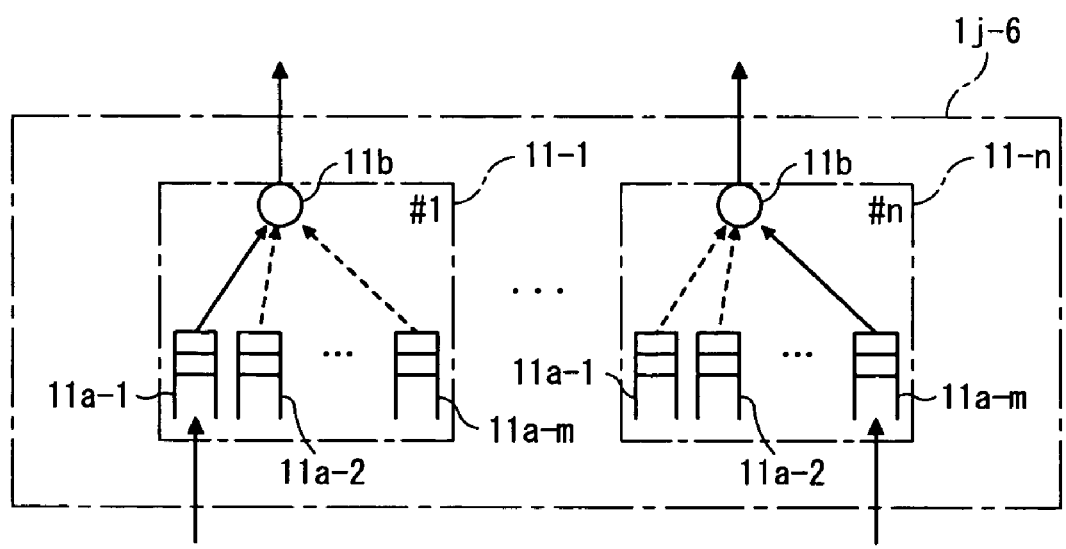

The scheduling part 1j-6 is equipped with schedulers 11-1 to 11-n arranged in parallel according to the number of channels (n in FIG. 3) that are framed, as shown in FIG. 3. Each of the schedulers is equipped with a series of queues 11a-1 to 11a-n set according to priorities, and a selector 11b.

The packet transmission-reception processing part 1jb functions as a header information terminating part and a scheduling part by the above-described header information terminating part 1j-5 and scheduling part 1j-6.

The packet encapsulation part 1j-7 of the framer-deframer 1ja encapsulates the data packet scheduled in the scheduling part 1j-6 and outputs it to the selector 1i. In other words, the data packet from the scheduling part 1j-6 is framed by the packet encapsulation part 1j-7.

Thus, the above-described SONET changeover switch 1e, frame identification switch 1g, TDM switch 1h, and selector 1i function as a first processing system 21, which performs, on channels set for voice traffic, a process that performs 1:1-protection communications by using working channels set in one of two paths when there is no failure, and switching the working channels to backup channels set in the other of the two paths when a failure is detected.

The above-described SONET changeover switch 1e, frame identification switch 1g, routing module 1j, and selector 1i function as a second processing system 22, which performs, on channels set for data traffic other than the voice traffic, a process that performs communications by using channels other than channels selected as working channels for a signal of an information type where importance is relatively high, in two paths (see the directions indicated by arrows WE and EW), when there is no failure.

Channels for data packet traffic can be set by the 5 following transmission topologies, each of which can perform a recovery process when a failure occurs.

(b1) First Channel Setting Configuration for Data Packet Traffic

Figure 5:
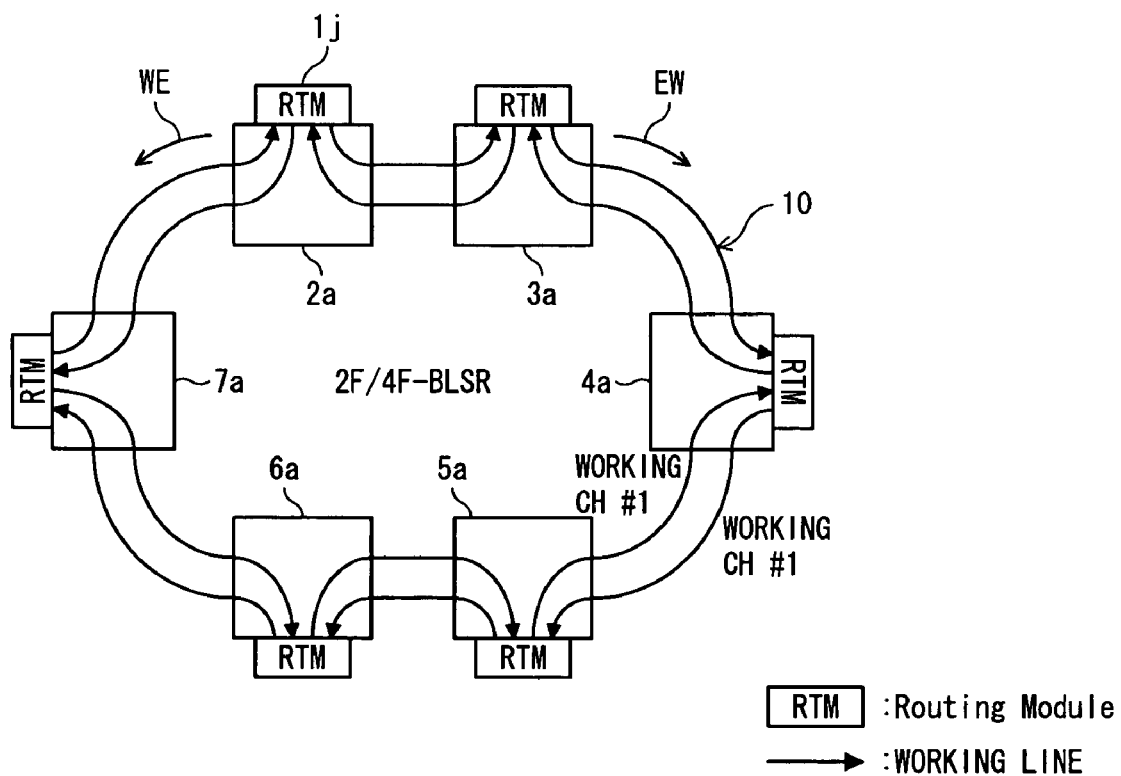
FIG. 5 is a diagram to explain a channel setting configuration that is a first topology for data packet traffic in the SONET ring constructed of the communication devices of this embodiment.

FIG. 5 is a diagram to explain a channel setting configuration that is a first topology for data packet traffic in the SONET ring 10 constructed of the communication devices 2a to 7a of this embodiment.

In the first topology for data packet traffic, when there is no failure, communications is performed by using working channels set for data packet traffic, in two paths WE and EW. When a failure is detected, communications is performed by switching to the backup channels set for those working channels.

For example, in the path WE between the communication device 4a and the communication device 5a, a channel #1 as a working channel is set for data packet traffic. Similarly, in the path EW between the communication device 5a and the communication device 4a, a channel #1 as a working channel is set for data packet traffic.

In other words, depending on the setting of the frame identification switch 1g, when the channel of an input SONET frame is a channel for voice traffic, the SONET frame can be directed to the TDM switch 1h. On the other hand, when it is a channel for data packet traffic, the SONET frame can be directed to the routing module 1j.

In the channels between adjacent communication devices in the 6 communication devices 2a to 7a constituting the SONET ring 10, as with the above-described case between the communication devices 4a and 5a, working channels for data packet traffic are set in the paths WE and EW.

That is, the working channels for data packet traffic in both paths constitute a bidirectional ring topology.

The router for handling data packet traffic (see reference numerals 2b to 7b in FIG. 4) is connected with the routing module (RTM) 1j through the interface card 1c, SONET recovery switch 1f, and frame identification switch 1g of the communication device 1. Between the router and the routing module 1j, signals are transferred by cross-contact. The packet transmission-reception processing part 1jb of the routing module 1j determines an output transmission line in the unit of a packet.

As described above, in the case where working channels are set for data packet traffic in both paths, a switching operation is performed in the following manner, if a line failure occurs.

That is, in the SONET recovery switch if shown in FIG. 1, when a line failure is detected by monitoring the K1/K2-byte information from the overhead terminating part 1a-1 of the interface card 1a, frame transmission is performed by switching to a backup line set in the path opposite to the path where the line failure occurred.

Figure 6:
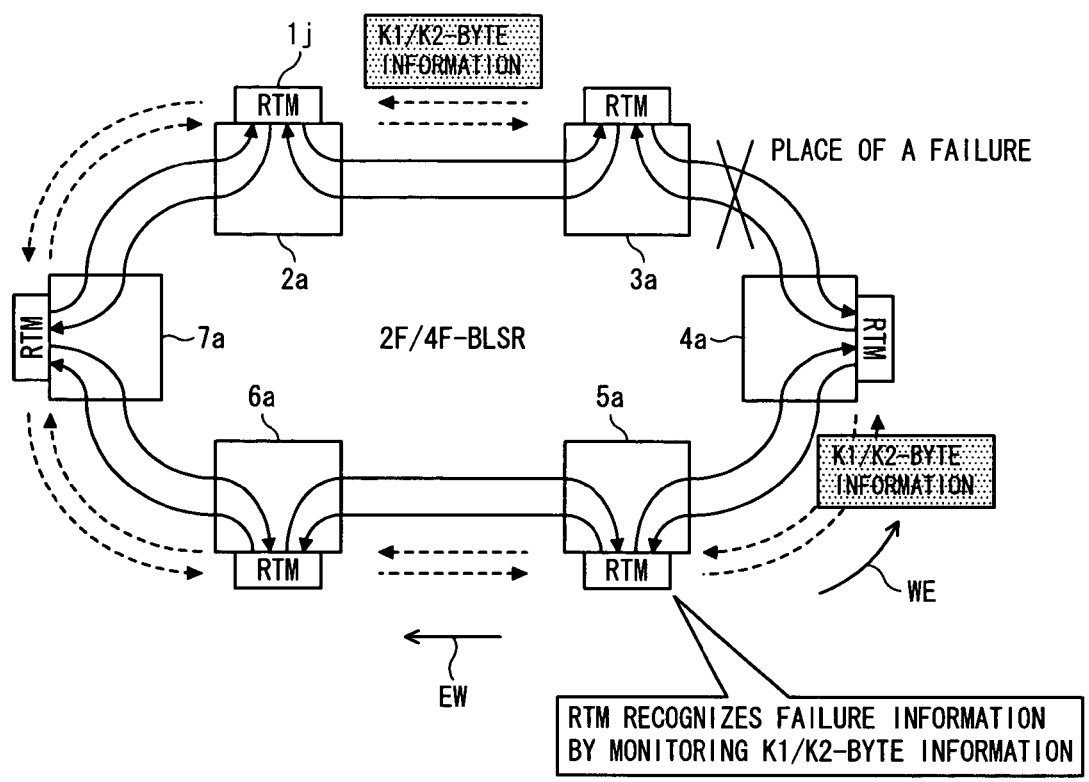
FIG. 6 is a diagram to explain how channels are switched in the first topology for data packet traffic when a failure occurs.

For example, as shown in FIG. 6, in the case where a frame is transmitting from the communication device 5a to the communication device 3a, it can be transmitted along the path WE through the communication device 4a, or along path EW through the communication devices 6a, 7a, and 2a. However, it is assumed that when there is no failure, data packet traffic addressed to the communication device 3a is transmitted by a working line set in the shorter path WE.

In the above-described case, if a failure occurs on the line between the communication devices 4a and 3a, the SONET recovery switch 1f, which is monitoring the K1/K2-byte information and other information from the overhead terminating part 1a-1, switches the working channel set in the path WE to a backup channel for that working channel set in the opposite path EW.

In this way, packet multiplexing and packet routing can be performed by the routing part 1j of each of the communication devices 2a to 7a of the SONET ring 10.

Thus, according to this embodiment, the first and second processing systems 21 and 22 make it possible to have working lines for data packet traffic, and by making efficient use of network resources while guaranteeing bandwidth and quality of service in the unit of a packet, efficient transmission of data packet traffic becomes possible and the bandwidth of data packet traffic can be increased.

Since the working lines in both directions are used as transmission lines for data traffic, the paths WE and EW in both directions can maintain connectability when a failure occurs. This renders it possible to provide service that 100 percent guarantees bandwidth and delays. In addition, it becomes possible to guarantee bandwidth and quality of service in the unit of a packet independently of a failure.

Further, in voice traffic and data packet traffic, 1:1-protection communications is guaranteed and the paths WE and EW in both directions maintain connectability when a failure occurs. Therefore, when a failure occurs, data packets can be recovered by only a recovery process in SONET, while guaranteeing bandwidth and quality of service in the unit of a packet. Thus, a failure recovery process doesn't have to be performed in the routing module $1j$.

(B2) Second Channel Setting Configuration for Data Packet Traffic

FIG. 7 is a diagram to explain a channel setting configuration that is a second topology for data packet traffic in the SONET ring 10 constructed of the communication devices $2a$ to $7a$ of this embodiment.

In the second topology for data packet traffic shown in FIG. 7, when there is no failure, communications is performed by using working channels for data packet traffic in one of two paths WE and EW, and communications is also performed by using backup channels in the other of the two paths.

For instance, in the case of the OC-48 level, a channel #1 as a working channel is set for data packet traffic in the path WE between the communication device $5a$ and the communication device $4a$, and a channel #26 as a backup channel is set for data packet traffic in the path EW between the communication device $4a$ and the communication device $5a$.

In other words, depending on the setting of the frame identification switch $1g$, when the channel of an input SONET frame is a channel for voice traffic, that frame can be directed to the TDM switch $1h$. On the other hand, when it is a channel for the above-described data packet traffic, that SOENT frame can be directed to the routing module $1j$.

In the channels between adjacent communication devices in the 6 communication devices $2a$ to $7a$ constituting the SONET ring 10, as with the above-described case between the communication devices $4a$ and $5a$, a working channel can be set for data packet traffic in the path WE, while a backup channel can be set for data packet traffic in the path EW.

Figure 9:
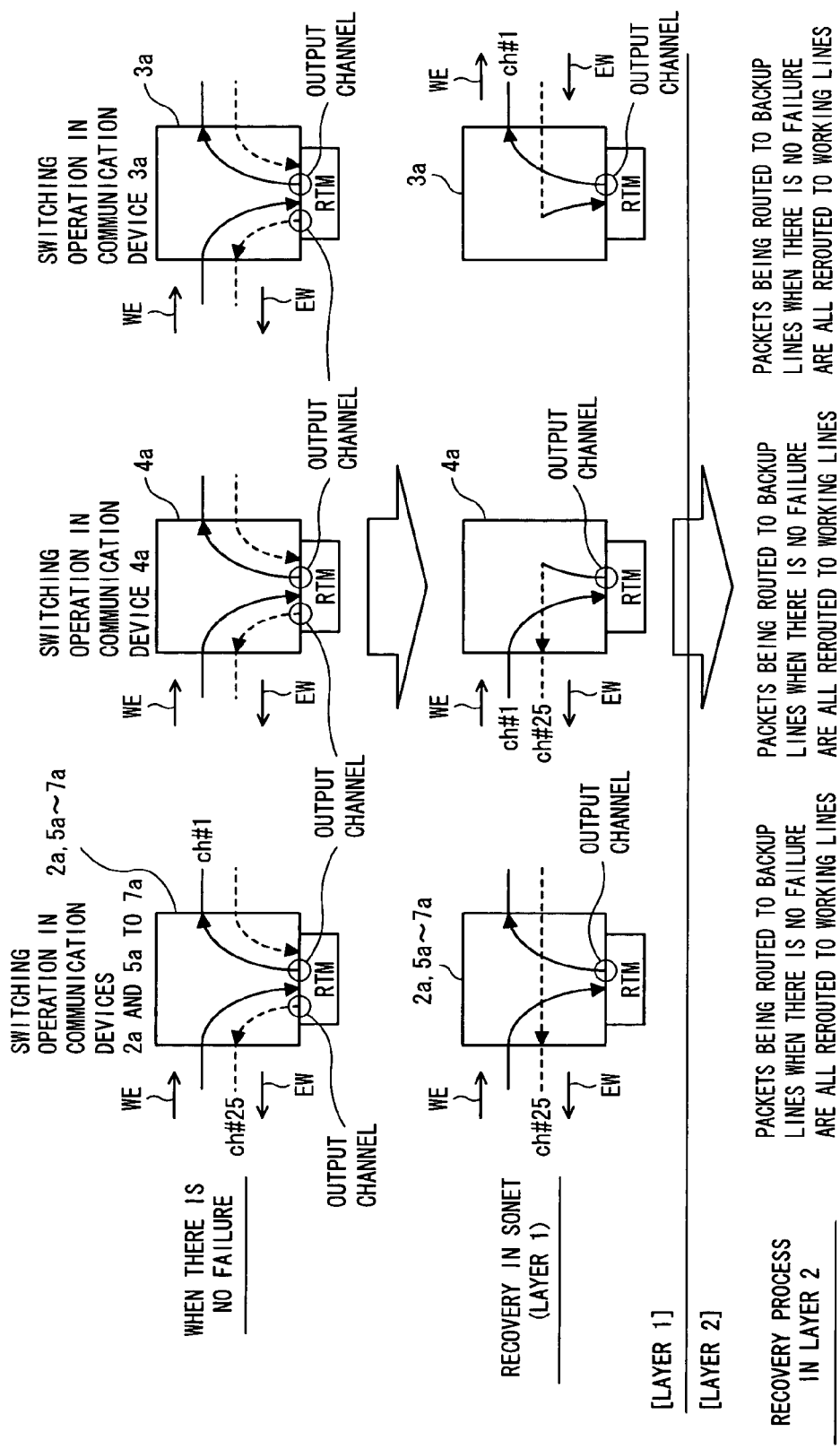

That is, a bidirectional ring topology can be constituted by using a working line for data packet traffic in one direction and a backup line for that working line in the other direction (see communication devices $2a$ to $7a$ when there is no failure, shown in FIG. 9).

As previously described, the frame of data packet traffic that is transmitted by the thus-constituted topology is split into data packets by the routing module $1j$ of each of the communication devices $2a$ to $7a$, and packet routing and packet multiplexing are performed. In other words, IP channels are connected to the routing module $1j$, in which they are processed.

If a failure occurs on a transmission line when data packet traffic is transmitted in the topology constructed as described above, an operation of switching a working channel to a backup channel is performed, as in the case of FIG. 5 described above.

Figure 8:
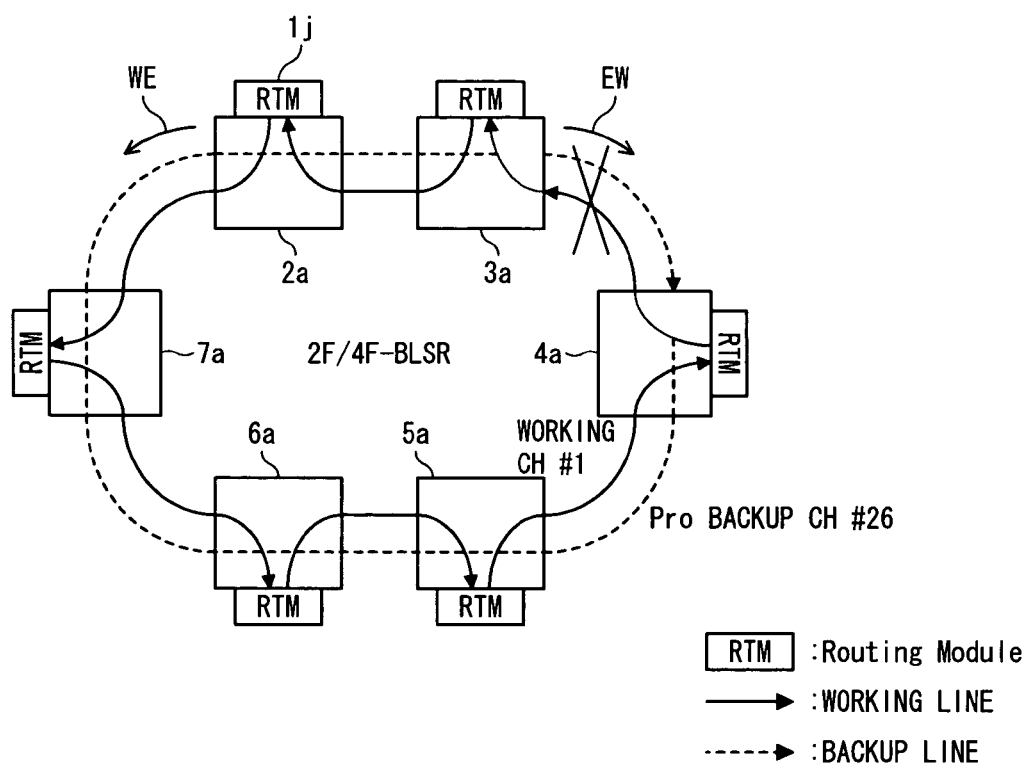
FIGS. 8 to 10 are diagrams to explain how channels are switched in the second topology for data packet traffic when a failure occurs.

For example, assume that data packet traffic is transmitted from the communication device $4a$ to the communication device $3a$ by using the working channel #1 set in the path WE. As shown in FIG. 8, if a failure occurs on the line between the communication devices $4a$ and $3a$, the SONET recovery switch $1f$, which is monitoring the K1/K2-byte information and other information from the overhead terminating part $1a$-1, switches a working channel #2 set for voice traffic in the path WE to the backup channel #26 for that working channel set in the opposite path EW.

That is, as shown in FIG. 9, with the switching operation in the SONET recovery switch $1f$ of the communication device $4a$, the traffic transmitted by the working channel #2 in the path WE is transmitted by the backup channel #26 set in the path EW, used for data packet traffic when there is no failure. Similarly, in the communication devices $2a$, $3a$, and $5a$ to $7a$, the traffic transmitted by the working channel is transmitted by the backup channel set for data packet traffic, as with the case of the communication device $4a$.

When a failure occurs, a header is replaced by the header replacing part $1j$-3 of the packet switch $1jc$, whereby the routing operation in the next stage is controlled and recovery operation is performed. Thus, routing information need not be manipulated and high-speed recovery and simplification of processing become possible.

More specifically, when a failure is detected in the backup channel of the channels set for data packet traffic in the two paths WE and EW, the routing part $1j$-4 reroutes the traffic to the working channel in order to bypass that failure.

That is, when a backup channel used for data traffic fails on the path EW, the data traffic using that backup channel is rerouted to a working channel that is used for data traffic in the opposite path WE.

For instance, in the communication device $4a$, data packets, transmitted by the backup channel #26 when there is no failure, are routed to the working channel #1 by the packet routing process in the routing part $1j$-4 that is a process in an upper layer than the SONET recovery switch $1f$. With the switching operation in the SONET recovery switch $1f$, frames can be transmitted by the backup channel #25, along with traffic using the working channel #1 when there is no failure. Thus, connectability can be assured.

Figure 10:
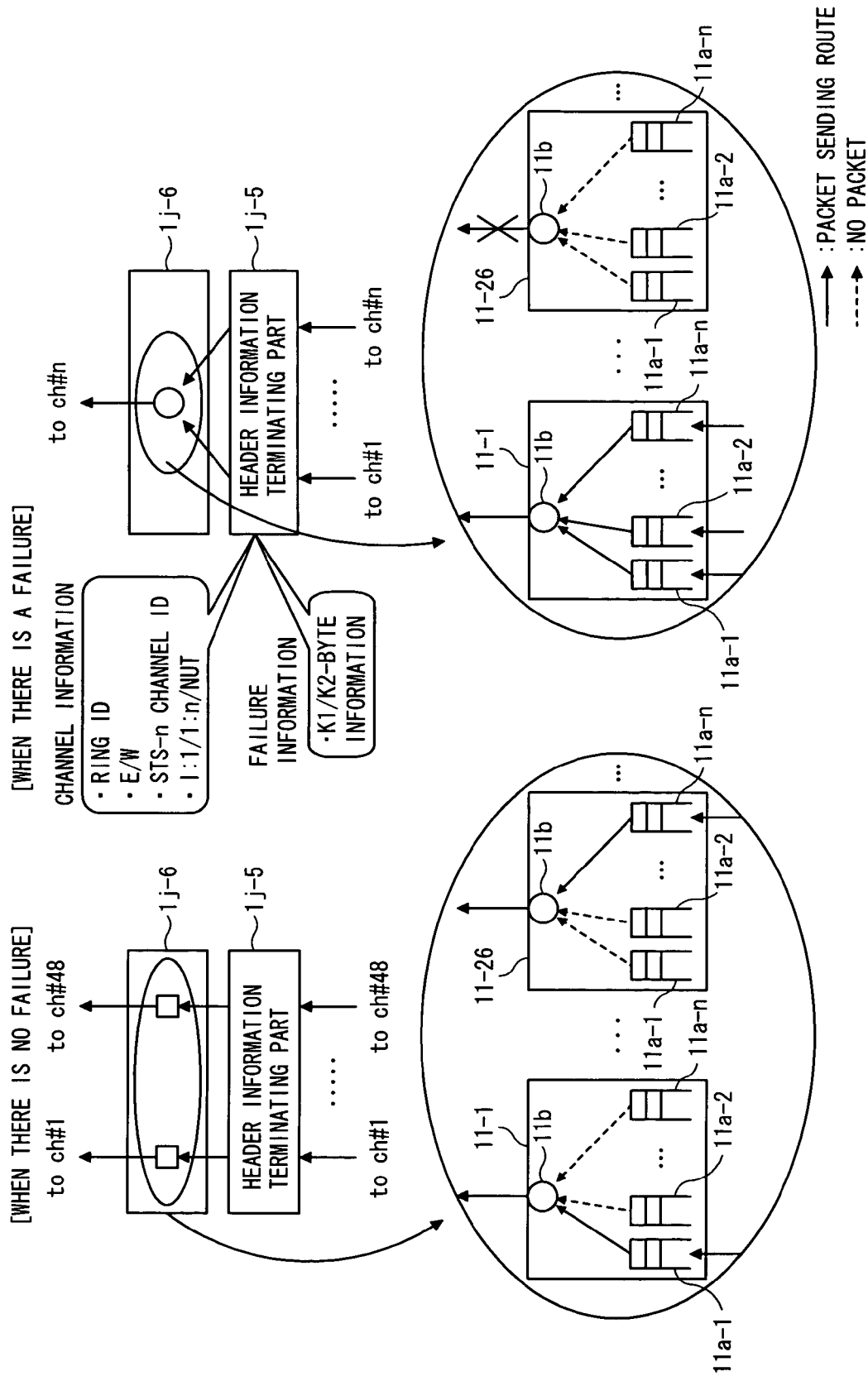

Also, in the header terminating part $1j$-5 of the packet transmitting-receiving part $1jb$ shown in FIG. 10, when there is no failure, the header information of each of data packets addressed to the working channel #1 and backup channel #26, routed in the routing part $1j$-4, is terminated and output to the corresponding schedulers 11-1 and 11-26 of the scheduling part $1j$-6.

However, when a failure has occurred, data packets whose header information was terminated are concentrated in the scheduler 11-1 corresponding to the working channel #1 and are output.

In the scheduler 11-1, scheduling is performed based on K1/K2-byte information, along with information, such as a ring ID, routing information (WE or EW), STS-1 channel ID and a ratio of working lines and backup lines for data packet traffic (1:1, 1:n, or NUT channels), which is the terminated header information described above. With the scheduling, traffic being transmitted by the channel #26 set in the path EW when there is no failure is transmitted by the channel #25 set in the path EW, along with traffic being transmitted by the channel #1 set in the path WE.

In other words, data packets from the above-described other channel #1, and data packets that a retransmitted by the channel #25 when there is no failure, are held in queues $11a$-1 to $11a$-$n$ different from one another, and in the selector $11b$, data packets stored in the queues $11a$-1 to $11a$-$n$ can be sent based on a packet sending schedule depending on quality of service, etc.

Thus, according to this embodiment, data traffic is transmitted by using working channels in one of the two paths and backup channels in the other of the two paths, whereby network resources are efficiently used. Therefore, efficient transmission of data packet traffic can be performed and the bandwidth of data packet traffic can be increased. In addition, when there is no failure, the number of working lines to be used as IP channels can be reduced without losing connectability when there is a failure, and the bandwidth of data packet traffic can be made inexpensive.

In addition, when a failure is detected in a backup channel by the routing part 1j-4, data packet traffic can be rerouted to a working channel to bypass that failure. Therefore, even if path switching by 1:1 protection occurs when a failure of a backup channel occurs, holding the connectability of data packet traffic transmitted by the backup channel becomes possible and data traffic, which is transmitted by channels set in both paths when there is no failure, can be guaranteed.

In the case where channel switching is performed on data packet traffic being transmitted by a backup channel, it can be based on the same information as information that is used as a recovery judgment by 1:1-protection channel switching is made. Therefore, the trigger of a recovery judgment in layer 1 by the SONET recovery switch 1f can be made consistent with that of a recovery judgment in layer 2 or greater by the routing module 1j, so there is no possibility that recovery judgments will differ from each other.

In addition, in the recovery judgment in layer 2 or greater by the routing module 1j, a failure can be recognized at the same speed (about 50 ms) as the case of layer 1 by the SONET recovery switch 1f, so a high-speed recovery judgment and a recovery judgment can be realized and recovery in layer 1 and recovery in layer 2 or greater can be simultaneously utilized.

Besides, with processing in the routing part 1j-4, connectability, assured when there is no failure, after the switching operation in the SONET recovery switch 1f, can be guaranteed with only processing in layer 2.

Moreover, because control for failure recovery operation can be performed only by the manipulation of header information such as the header replacement in the header replacing part 1j-3, routing information doesn't need to be manipulated and the processing load in the card 1e can be lightened. Thus, high-speed recovery becomes possible.

Note that as the above-described backup channel in the path EW, a channel #25 as a backup channel for the working channel #1 set for data packet traffic can also be set for data packet traffic.

(B3) Third Channel Setting Configuration for Data Packet Traffic

Figure 12:
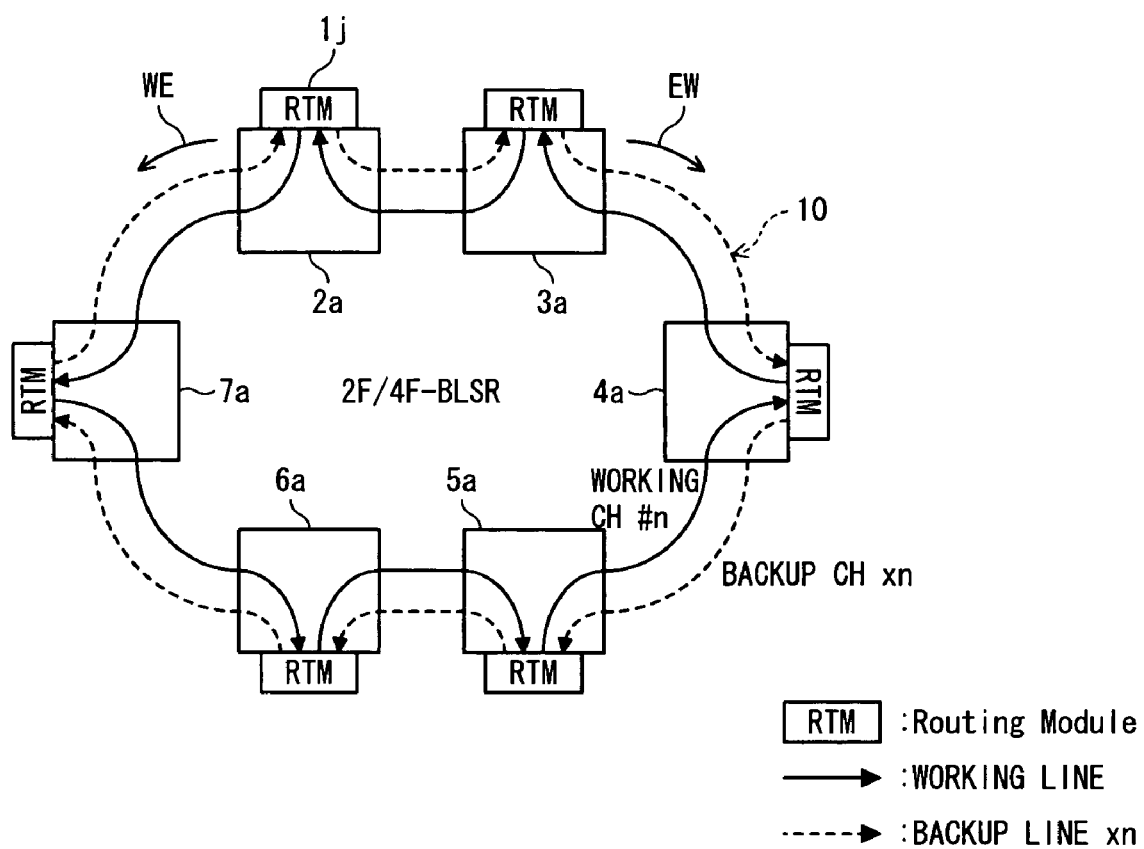
FIG. 12 is a diagram to explain a channel setting configuration that is a third topology for data packet traffic in the SONET ring constructed of the communication devices of this embodiment.

FIG. 12 is a diagram to explain a channel setting configuration that is a third topology for data packet traffic in the SONET ring 10 constructed of the communication devices 2a to 7a of this embodiment.

In the third topology for data packet traffic, when there is no failure, communications is performed by using working channels for data packet traffic in one of two paths WE and EW, and using backup channels greater in capacity than those working channels in the other of the two paths.

More specifically, as shown in FIG. 9, when there is no failure, communications is performed by using working channels for data packet traffic in one of the two paths WE and EW, and communications is also performed by using backup channels greater in number than those working channels in the other of the two paths.

In particular, communications is performed by using not only backup channels for the working channels set for data packet traffic but also backup channels for counterparts set for voice traffic.

For instance, in the case of the OC-48 level, in the path WE between the communication devices 4a and 5a, a channel #1 as a working channel is set for data packet traffic. In the path EW between the communication devices 4a and 5a, backup channels #26 to #48 for the working channels for voice traffic are set for data packet traffic, along with a channel # 25 as a backup channel for the above-described working channel #1 set in the path WE.

In other words, depending on the setting of the frame identification switch 1g, when the channel of an input SONET frame is a channel for voice traffic, that frame can be directed to the TDM switch 1h. On the other hand, when it is a channel for the above-described data packet traffic, that frame can be directed to the routing module 1j.

In the channels between adjacent communication devices in the 6 communication devices 2a to 7a constituting the SONET ring 10, as with the case between the communication devices 4a and 5a, a working channel for data packet traffic is set so a bidirectional ring topology can be constructed.

In this case, data that is transmitted by the backup channels #26 to #48 differs from data to be transmitted by the working channels #2 to #25 where framing is performed by a first processing system 20 via a TDM switch 1h, in that it is packetized as data packet traffic by a second processing system 22.

As previously described, a frame for data packet traffic, such as an IP frame that is transmitted by the thus-constituted topology, are split into data packets by the routing module 1j of each of the communication devices 2a to 7a, and packet multiplexing and packet routing are performed.

If a failure occurs on a transmission line when data packet traffic is transmitted in the topology constructed as described above, an operation of switching a working channel to a backup channel is performed, as with the case of FIG. 5 described above.

In this case, by the routing of data packets in an upper layer, the data packets, transmitted by the backup channels #25 to #48 in the path EW when there is no failure, are also transmitted along with data packets transmitted by the working channels #1 to #24 set in the path WE, as with the case of FIG. 7. In this way, connectability can be assured.

That is, data packets, transmitted by the backup channels #25 to #48 when there is no failure, are routed to the working channel #1 by the packet routing process in the routing part 1j-4 that is a process in an upper layer than the SONET recovery switch 1f. With the switching operation in the SONET recovery switch 1f, traffic transmitted by backup channels #25 to #48 can be transmitted by the backup channel #25, along with traffic using the working channel #1 when there is no failure. Thus, connectability can be guaranteed.

Also, data packets with header information terminated by the header terminating part 1j-5 of the packet transmission-reception processing part 1jb are concentrated in the scheduler 11-1 corresponding to the working channel #1 and are output. In other words, data packets from backup channels #25 to #48 are held in queues 11a-1 to 11a-n of the scheduler 11-1, and they are output to the packet encapsulation part 1j-7 by a scheduling process based on the header information and depending on quality of service, etc.

Thus, according to this embodiment, working channels can be used in one of the two paths to transmit data traffic, and backup channels greater in capacity than those working channels can be used in the other path to transmit data traffic.

Therefore, the number of working channels to be used as IP channels can be considerably reduced and the number of working channels required for constituting a bidirectional ring topology can be minimized. This renders it possible to provide the transmission bandwidth of data traffic at low cost and in large capacity.

In addition, when a failure is detected in a backup channel by the routing part 1*j*-4, data packet traffic can be rerouted to a working channel to bypass that failure. Therefore, even if path switching by 1:1 protection occurs when a failure of a backup channel occurs, traffic is guaranteed to be transmitted by channels set for data packet traffic in both paths when there is no failure.

Figure 11:
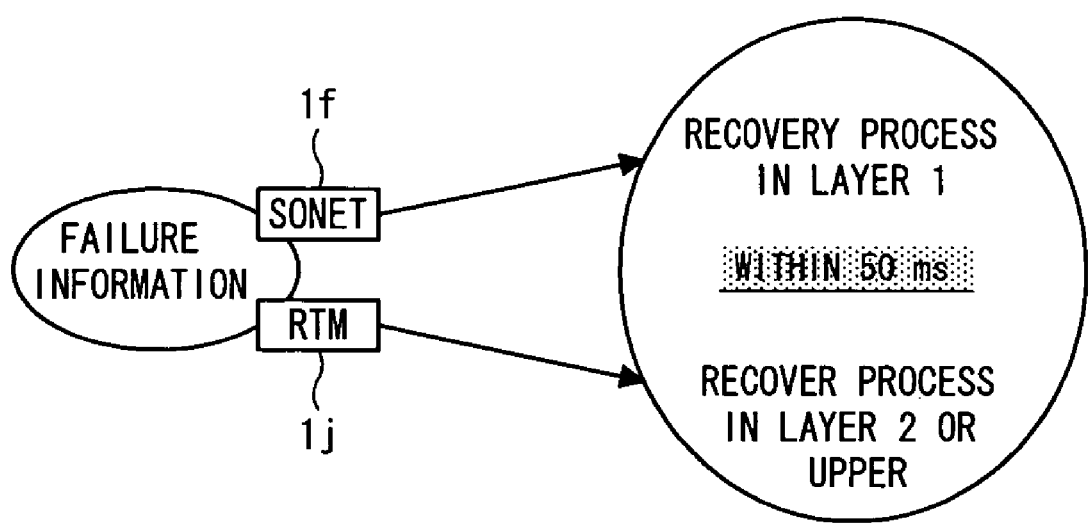
FIG. 11 is a diagram to explain a recovery judgment in layer 1 that is made in the SONET recovery switch of this embodiment, and a recovery judgment in layer 2 or greater that is made by the routing module.

Besides, the routing module 1*j* can recognize failure information by monitoring K1/K2-byte information. Therefore, as shown in FIG. 11, the trigger of a recovery judgment in layer 1 by the SONET recovery switch 1*f* can be made consistent with that of a recovery judgment in layer 2 or greater by the routing module 1*j*. Moreover, in the recovery judgment in layer 2 or greater by the routing module 1*j*, a failure can be recognized at the same speed (about 50 ms) as the case of layer 1 by the SONET recovery switch 1*f*, so a high-speed recovery judgment can be realized.

With processing in the scheduling part 1*j*-6, connectability, assured when there is no failure, after the switching operation in the SONET recovery switch 1*f*, can be guaranteed with only processing in layer 2.

Furthermore, when there is no failure, the working channels in one path WE and backup channels in the other path EW constitute a bidirectional ring. Therefore, the number of working channels, which are used as IP channels when there is no failure, can be reduced without losing connectability when there is a failure, and the bandwidth of data packet traffic can be made inexpensive.

(B4) Fourth Channel Setting Configuration for Data Packet Traffic

Figure 13:
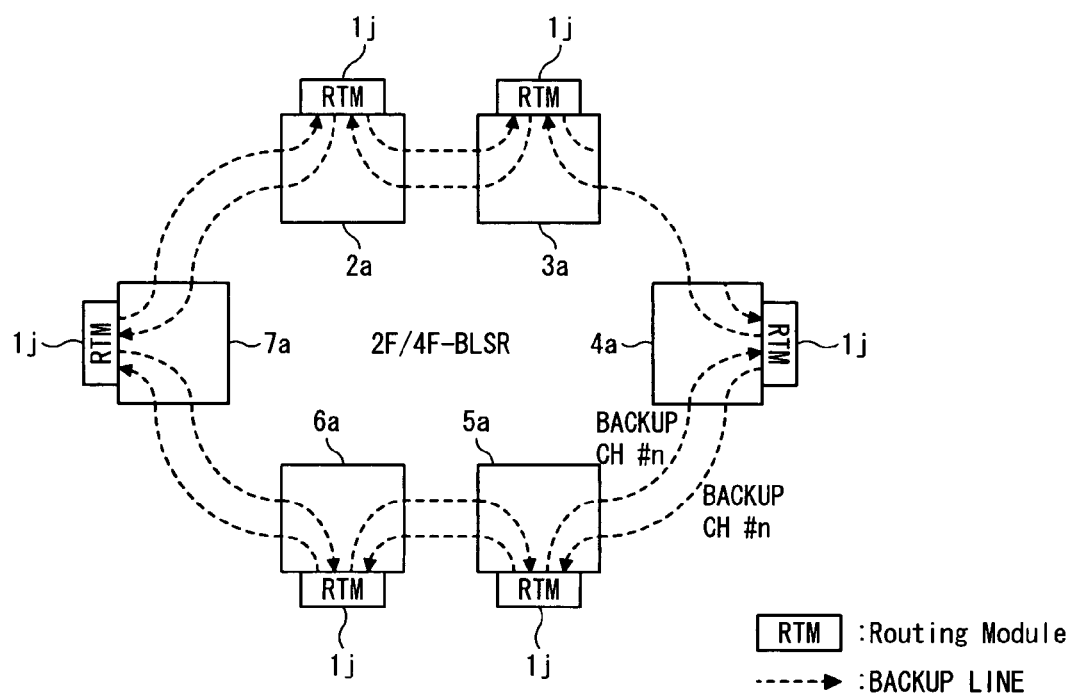
FIG. 13 is a diagram to explain a channel setting configuration that is a fourth topology for data packet traffic in the SONET ring constructed of the communication devices of this embodiment.

FIG. 13 is a diagram to explain a channel setting configuration that is a fourth topology for data packet traffic in the SONET ring 10 constructed of the communication devices 2*a* to 7*a* of this embodiment.

In the fourth topology for data packet traffic shown in FIG. 13, when there is no failure, backup channels in two paths WE and EW are set for data packet traffic to perform communications.

As shown in FIG. 13, in the case of the OC-48 level, in the path WE between the communication devices 4*a* and 5*a*, a channel #48 as a backup channel is set for data packet traffic. Similarly, in the path EW between the communication devices 5*a* and 4*a*, a channel #48 as a backup channel can be set for data packet traffic.

In other words, depending on the setting of the frame identification switch 1*g*, when the channel of an input SONET frame is a channel for voice traffic, that frame can be directed to the TDM switch 1*h*. On the other hand, when it is a channel for the above-described data packet traffic, the SONET frame can be directed to the routing module 1*j*.

That is, if only backup channels that are used via the TDM switch 1*h* are used for data packet traffic as IP channels, a bidirectional ring topology consisting of backup channels in both paths WE and EW can be constructed.

Thus, according to this embodiment, backup channels for voice traffic are used in both paths. Therefore, when there is no failure, working channels does not have to be used to transmit data packets. Thus, the transmission bandwidth of data traffic can be provided at substantially less cost and in large capacity.

Note that in the fourth topology for data packet traffic, when a working channel is switched to a backup channel because of a line failure, voice traffic is transmitted by a channel that is used for data packet traffic.

In this case, after a new packet path is formed by updating a routing topology with routing protocols such as OSPF (Open Shortest Path First) and RIP (Routing Information Protocol), routing is performed, whereby a line failure can be recovered.

(B5) Fifth Channel Setting Configuration for Data Packet Traffic

Figure 14:
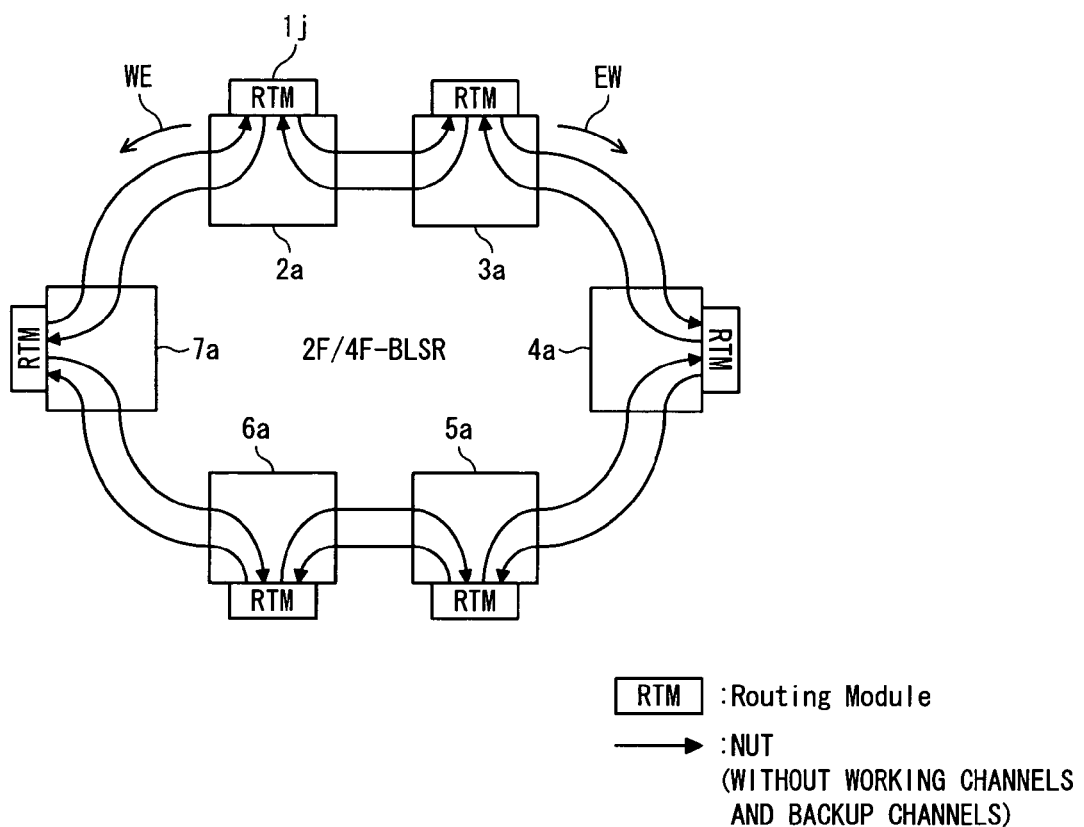
FIG. 14 is a diagram to explain a channel setting configuration that is a fifth topology for data packet traffic in the SONET ring constructed of the communication devices of this embodiment.

FIG. 14 is a diagram to explain a channel setting configuration that is a fifth topology for data packet traffic in the SONET ring 10 adopting 2F/4F-BLSR, constructed of the communication devices 2*a* to 7*a* of this embodiment.

In the fifth topology for data packet traffic shown in FIG. 14, when there is no failure, channels for non-preemptive unprotected traffic (NUT) having no redundant channels are set in two paths WE and EW to transmit data packet traffic.

In other words, depending on the setting of the frame identification switch 1*g*, when the channel of an input SONET frame is a channel for voice traffic, that frame can be directed to the TDM switch 1*h*. On the other hand, when it is a NUT channel for data packet traffic, that frame can be directed to the routing module 1*j*.

That is, if NUT channels are used for data packet traffic as IP channels, a bidirectional ring topology consisting of backup channels in both paths WE and EW can be constructed.

Therefore, when there is no failure, the routing module 1*j* can perform packet multiplexing and packet routing on channels that are used as IP channels.

In the fifth topology shown in FIG. 14, when there is a failure, the shortest transmission path can be recognized to determine an output line by hop-by-hop routing. Thus, propagation delay time can be minimized.

Figure 15:
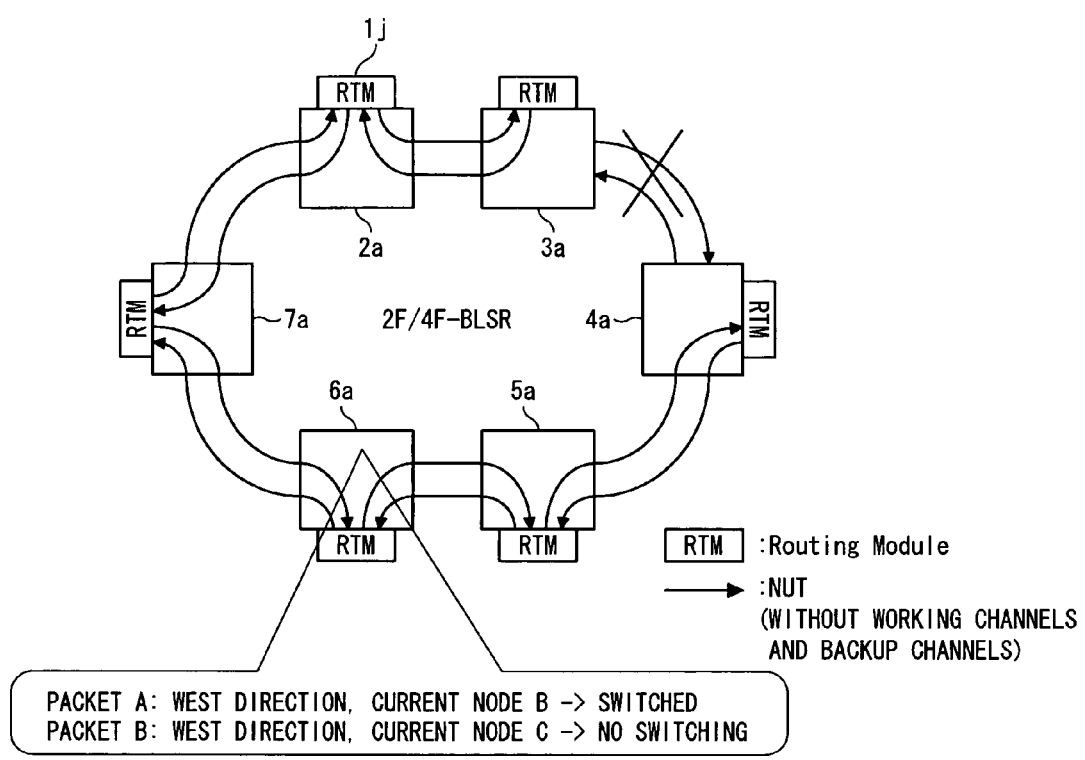
FIGS. 15 to 17 are diagrams to explain how channels are switched in the fifth topology for data packet traffic when a failure occurs.

More specifically, as shown in FIG. 15, if a failure occurs on a transmission line between the communication devices 4*a* and 3*a*, the SONET recovery switch 1*f*, which is monitoring the K1/K2-byte information from the overhead terminating part 1*k*, switches a working channel to a backup channel, for channels other than NUT channels.

Also, when the above-described failure occurs, the SONET recovery switch 1*f* does not perform a switching operation on the NUT channels that transmit data packet traffic.

For example, the communication device 4*a* will not be able to transmit data packets to the communication device 3*a* as a SOENT frame because of a line failure, because the switching operation by the SONET recovery switch 1*f* is not performed on the NUT channels. Likewise, the communication device 3*a* will not be able to transmit data packets to the communication device 4*a* as a SOENT frame.

Figure 17:
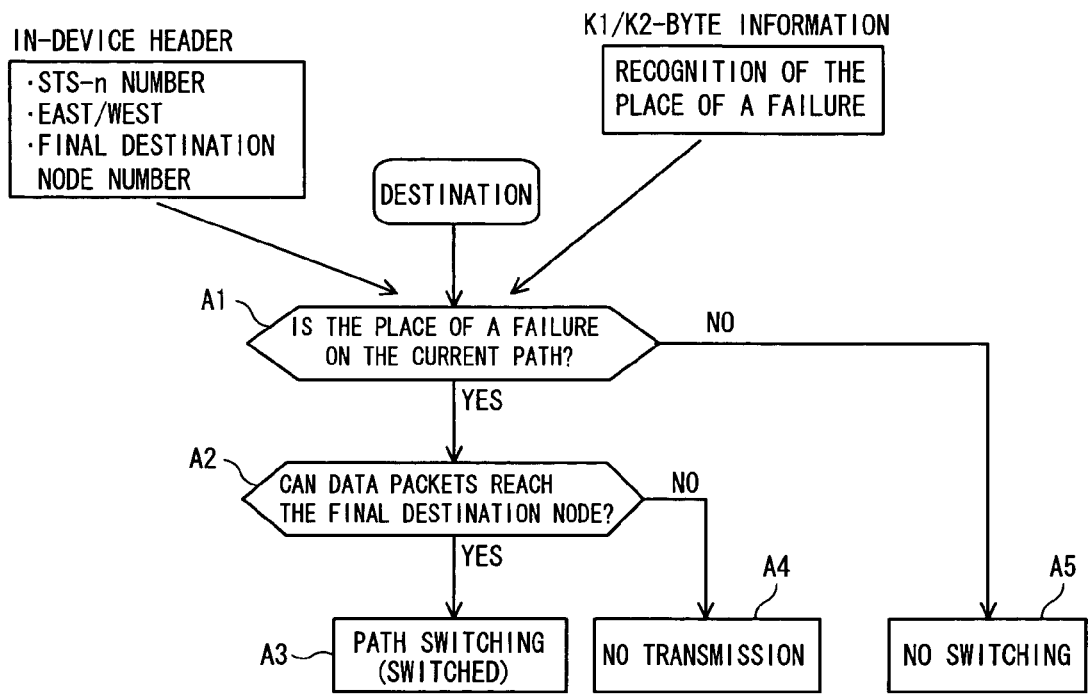

Hence, in each of the communication devices 2*a* to 7*a*, the packet switch 1*jc* performs a routing process, along with a recovery operation judgment and a transmission stop judgment, as shown in FIG. 17. In this way, when a failure occurs on the NUT channels that transmit data packet traffic, it can be recovered.

More specifically, in the header replacing part 1*j*-3 of the packet switch 1*jc*, a key for retrieving destination-node information is added as header information, whereby the routing part 1*j*-4 can implement a recovery operation judgment and a transmission stop judgment when a failure occurs. The retrieval key in this case can employ a transmission channel number.

In addition, in the routing part 1*j*-4, the destination-node information in both paths WE and EW is obtained from the header information replaced in the header replacing part 1j-3. When determining destination, it can be judged whether routing is performed, based on destination-node information and failure information.

That is, the routing part 1j-4 recognizes the place of a failure, that is, communication devices between which a failure has occurred, or a communication device within which a failure has occurred, based on header information such as a STS-n number, routing information, and destination-node ID, and K1/K2-byte information for recognizing the place of a failure.

In the case where the place of a failure recognized is on the current path (YES in step A1) and data packets can reach the final destination node (communication device) by switching paths, data packets constituting a SONET frame are switched to the NUT channel set in the opposite path (from step A2 to step A3; recovery operation judgment).

On the other hand, in the case where the place of a failure recognized is on the current path, but data packets cannot reach the final destination node by path switching because of double failures, etc., neither transmission of those packets nor routing is performed (from step A2 to step A4; transmission stop judgment).

In the case where the place of a failure recognized is not on the current path, and data packets can reach the final destination node without switching paths, the packet switch 1jc does not change the path (from step A1 to step A5).

For instance, consider the communication device 4a. In the routing part 1j-4, the data packet traffic, which is transmitted to the communication device 3a when there is no failure, is routed to the NUT channel on the side of the communication device 5a in the opposite path when it can reach its destination by path switching, by a packet routing process based on the K1/K2-byte information that is a process in an upper layer than the SONET recovery switch 1f (see a recovery process in layer 2 shown in FIG. 16).

Figure 16:
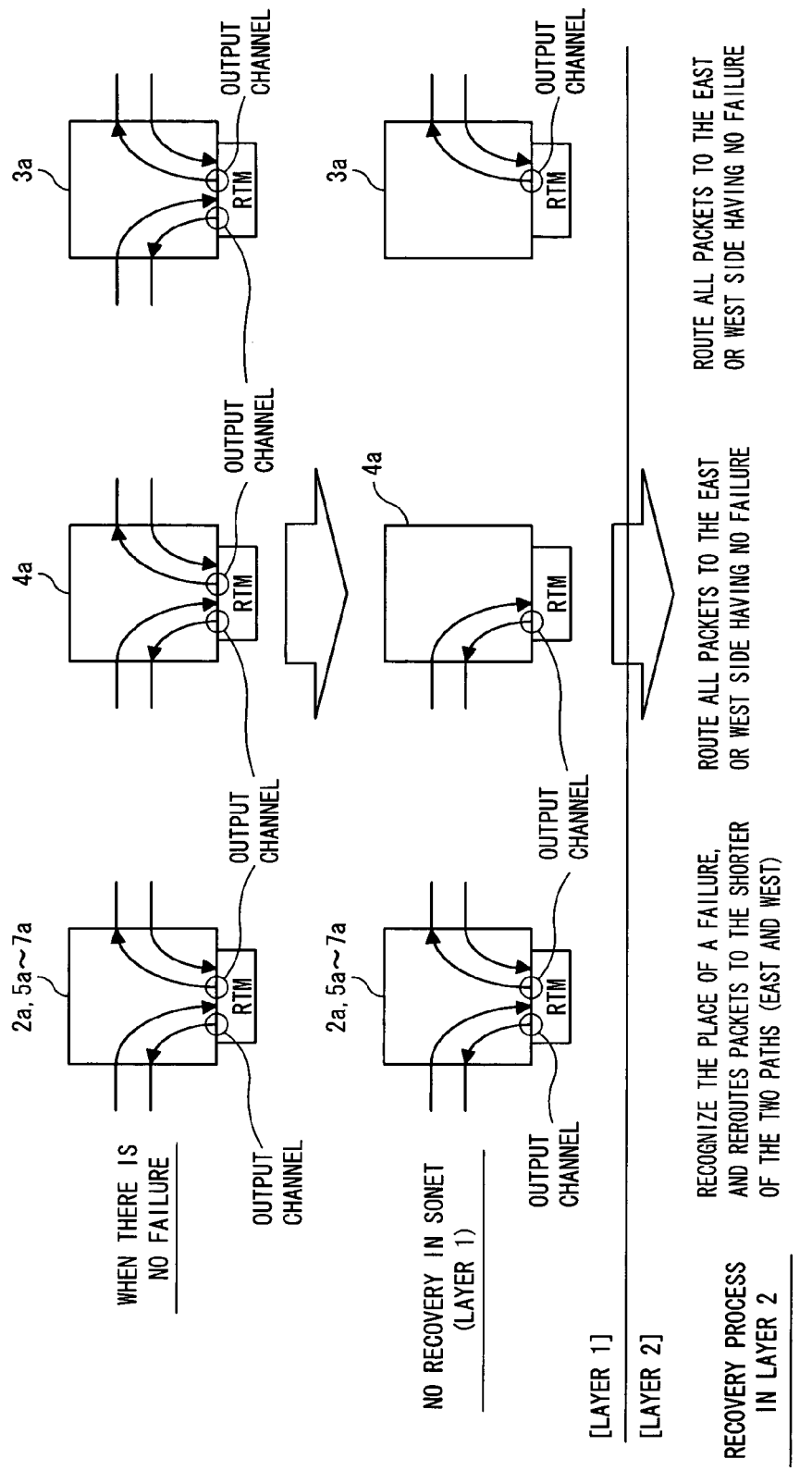

In the case of the communication device 3a, as with the above-described case, the data packet traffic, which is transmitted to the communication device 4a when there is no failure, is routed to the NUT channel on the side of the communication device 2a in the opposite path when it can reach its destination by path switching (see a recovery process in layer 2 shown in FIG. 16).

In the case of the communication devices 2a and 5a to 7a, the packet switch 1jc recognizes the place of a failure on the SONET ring 10, based on the above-described K1/K2-byte information. Also, a path on the side of the shortest route that will bypass the place of a failure is determined as a path on which data packets are output. In the routing part 1j-4, data packets are routed to the NUT channel in the determined path (see a recovery process in layer 2 shown in FIG. 16).

Thus, when there is no failure, by using channels for non-preemptive unprotected traffic in two paths, it is not necessary to prepare working and backup channels that are used as IP channels. This makes it possible to provide the bandwidth of data traffic at low cost. When there is a failure, it is also possible to provide a topology guaranteeing a minimum propagation delay time at low cost without depending on SONET rings.

While the present invention has been described with reference to the preferred embodiment thereof, the invention is not to be limited to the details given herein, but may be modified within the scope of the invention hereinafter claimed.

Note that the person having ordinary skill in the art would construct apparatus according to the present invention disclosed in this embodiment.

INDUSTRIAL APPLICABILITY

As described above, in SONET rings adopting 2F/4F-BLSR, the communication method and communication device of the present invention use transmission bandwidth efficiently and are useful to transmit data traffic. Particularly, they are suitable to efficiently transmit IP packet traffic showing a tendency to increase.

The invention claimed is:

1. A communication method for a network where a plurality of communication devices are interconnected and a plurality of pairs of working channels and backup channels are set in two paths between adjacent communication devices to perform 1:1-protection communications, said communication method comprising the steps of:

performing said 1:1-protection communications by switching from working channels set in one of said two paths to corresponding backup channels set in the other of said two paths based on the location of a detected failure; wherein for first information traffic of a type where importance determined by the type of information to be transmitted is relatively high, said communication devices perform said 1:1-protection communications to set channel in use to a first working channel set in one of said two paths when there is no failure, and to set channel in use to said corresponding backup channel set in the other of said two paths based on the location of the detected failure when the failure is detected; and for second information traffic of a type where said importance is relatively low, said communication devices perform communications to set channels in use to a second working channel other than said first working channel, in one of said two paths and to at least said backup channel for said second working channel when there is no failure, while said communication devices perform a routing process to change said channel in use from said backup channel for said second working channel to said second working channel, and perform communications, for said second information traffic having set channel in use to said second working channel and having changed channel in use to said second working channel, to set channels in use to said backup channel for said second working channel by said switching for said 1:1-protection communications, based on the location of the failure, when the failure is detected.

2. The communication method as set forth in claim 1, wherein for said second information traffic, said communication devices perform communications to set channels in use to said second working channel in one of said two paths, and said backup channel for said first and second working channel when there is no failure, while said communication devices perform the routing process to change said channel in use from said backup channel for said first and second working channel to said second working channel, and perform communications, for said second information traffic having set channel in use to said second working channel and having changed channel in use to said second working channel, to set channels in use to said backup channel for said second working channel by said switching for said 1:1-protection communications, on the basis of the location of the failure, when the failure is detected, or said communication devices perform communications to change said channel in use from said second working channel to said backup channel for said second working channel by said switching for said 1:1:-protection communications, on the basis of the location of the failure.

3. A communication method for a network where a plurality of communication devices are interconnected and a plurality of pairs of working channels and backup channels are set in two paths between adjacent communication devices to perform 1:1-protection communications, said communication method comprising the steps of:

performing said 1:1-protection communications by switching from working channels set in one of said two paths to corresponding backup channels set in the other of said two paths based on the location of a detected failure; wherein for voice traffic, said communication devices perform said 1:1-protection communications to set channel in use to a first working channel set in one of said two paths when there is no failure, and to set channel in use to said corresponding backup channel set in the other of said two paths based on the location of the detected failure when the failure is detected; and for data traffic other than said voice traffic, said communication devices perform communications to set channels in use to a second working channel other than said first working channel in one of said two paths and to at least said backup channel for said second working channel when there is no failure, while said communication devices perform a routing process to change said channel in use from said backup channel for said second working channel to said second working channel, and perform communications, for said data traffic having set channel in use to said second working channel and having changed channel in use to said second working channel, to set channels in use to said backup channel for said second working channel by said switching for said 1:1-protection communications, based on the location of the failure, when the failure is detected.

4. The communication method as set forth in claim 3, wherein, when there is no failure, said data traffic is transmitted by using working channels for said data traffic in one of said two paths and also using backup channels for said data traffic greater in capacity than said working channels in the other of said two paths.

5. The communication method as set forth in claim 3, wherein, when there is no failure, said voice traffic is transmitted by using backup channels for said voice traffic in said two paths.

6. The communication method as set forth in claim 3, wherein, when there is no failure, said voice traffic is transmitted by using channels for non-preemptive unprotected traffic in said two paths.

7. The communication method as set forth in claim 3, wherein, when the failure is detected in the backup channel of the working and backup channels in the two paths that transmit said data traffic, said data traffic is rerouted to the working channel to bypass said failure.

8. The communication method as set forth in claim 7, wherein, when the backup channel that is used for data traffic cannot be used in said other path because of the failure, said data traffic using said backup channel is rerouted to the working channel for data traffic set in said one path.

9. The communication method as set forth in claim 3, wherein the method is for a ring network for transmitting a transmission frame according to the same protocol as a synchronous network; and for data packet traffic as said data traffic, performing communications by using channels other than said working channels for said voice traffic in said two paths when there is no failure.

10. The communication method as set forth in claim 9, wherein the failure is detected from the header information of a frame transmitted through said synchronous network.

11. A communication device for use in a synchronous network that includes a plurality of pairs of working channels and backup channels for performing 1:1-protection communications for frame transmission by employing two paths, said communication device comprising:

a first processing system that performs, on voice traffic, a process for said 1:1-protection communications by using working channels set in one of said two paths when there is no failure, and by switching to backup channels set in the other of said two paths when a failure is detected; and a second processing system that performs, on data traffic other than said voice traffic, a process for communications by using channels other than working channels for a signal of an information type where importance is relatively high, in said two paths when there is no failure, wherein said first processing system comprises:

a path changing switch that, based on overhead information of a transmission frame input through said synchronous network, uses a working channel when there is no failure, and switches to a backup channel set in the other path to transmit said frame onto said synchronous network when there is a failure, an identification switch that identifies frame information input from said path changing switch as the voice traffic or the data traffic according to the setting of a channel, a time-division multiplexing switch that performs time-division multiplexing on the frame information of the voice traffic identified by said identification switch, and a selector that outputs both said time-division multiplexed voice traffic and said data traffic to said path changing switch; and said second processing system comprises:

said path changing switch, identification switch, and selector shared with said first processing system, and a data traffic processing part that reconstitutes the frame information of the data traffic identified by said identification switch as a frame for a predetermined data traffic channel, based on the header information of said transmitted frame and the destination of each data packet.

12. The communication device as set forth in claim 11, wherein said data traffic processing part comprises:

a framer-deframer for splitting the frame information of said data traffic from said identification switch into data packets, packaging data packets into frames, and outputting said frames to said selector;

a packet transmission-reception processing part for performing a reception process on said data packets split by said framer-deframer, and performing a transmission process on said data packets that are packaged into frames by said framer-deframer; and a packet switch for performing a necessary routing process on said data packets on which said reception process was performed by said packet transmission-reception processing part.

13. The communication device as set forth in claim 11, wherein said data traffic processing part comprises:

a packet synchronization processing part for performing a packet synchronization process on the frame information from said identification switch and splitting it into data packets;

a header information application part for applying information containing the receiving-channel information of the frame information that is split into data packets in the packet synchronization processing part, as header information;

a packet switch for performing a necessary routing process on the data packets from said header information application part;

a header information terminating-scheduling part for terminating said header information applied by said header information application part and performing a scheduling process required for frame transmission in said network, on said data packets on which said routing process was performed by said packet switch; and a packet encapsulation part for encapsulating said data packets on which said scheduling process was performed by said header information terminating-scheduling part, and outputting them to said selector.

14. The communication device as set forth in claim 13, wherein:

said header information application part is constructed to apply information on the failure in said network that is contained in said header information;

said routing part is constructed to perform said routing process in relation to the path switching operation performed by said path changing switch, based on said information on the failure contained in said header information; and said header information terminating-scheduling part is constructed to perform scheduling on a plurality of series of traffic that conflict due to the routing process performed in said routing part.

15. The communication device as set forth in claim 14, wherein overhead information, which is employed as said header information application part applies header information containing information on the failure in said synchronous network, is the same as overhead information that is employed as said failure is judged by said path changing switch.

16. The communication device as set forth in claim 14, wherein:

said second processing system is constructed to use working channels in one of said two paths and backup channels in the other of said two paths to transmit said data traffic, when there is no failure; and said routing part is constructed to perform a routing process so that the backup channels used when there is no failure are switched to working channels that are used in one of said two paths when the failure is detected in the other of said two paths on the basis of the information on the failure contained in said header information.

17. The communication device as set forth in claim 14, wherein:

said second processing system is constructed to use channels for non-preemptive unprotected traffic in said two paths when there is no failure; and said routing part is constructed to perform a routing process to bypass a place of the failure in said synchronous network, based on said information on the failure contained in said header information.

18. The communication device as set forth in claim 17, wherein said routing part is constructed so that when it is judged from the header information applied in said header information application part that traffic cannot reach its destination even in said two paths, data packets to said destination are not routed.

19. The communication device as set forth in claim 11, wherein said second processing system is constructed so that when there is no failure, working channels set for said data traffic are used in said two paths, and when the failure is detected, said working channels are switched to the backup channels set for said working channels.

20. The communication device as set forth in claim 11, wherein said second processing system uses working channels in one of said two paths and backup channels in the other of said two paths to transmit said data traffic, when there is no failure.

21. The communication device as set forth in claim 20, wherein said second processing system uses working channels in one of said two paths and also uses both backup channels set for said working channels and backup channels set for other information types in the other of said two paths, to transmit said data traffic, when there is no failure.

22. The communication device as set forth in claim 11, wherein said second processing system is constructed to use backup channels in said two paths to transmit said voice traffic, when there is no failure.

23. The communication device as set forth in claim 11, wherein said second processing system is constructed to use channels for non-preemptive unprotected traffic in said two paths when there is no failure.

* * * * *